United States Patent
Hayashi

(10) Patent No.: US 10,438,430 B2
(45) Date of Patent: Oct. 8, 2019

(54) ON-VEHICLE DEVICE, MOBILE DEVICE, AND VEHICLE WIRELESS COMMUNICATION SYSTEM

(71) Applicant: Panasonic Intellectual Property Management Co., Ltd., Osaka (JP)

(72) Inventor: Naoki Hayashi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/991,836

(22) Filed: May 29, 2018

(65) Prior Publication Data

US 2018/0276926 A1 Sep. 27, 2018

Related U.S. Application Data

(63) Continuation of application No. PCT/JP2016/005058, filed on Dec. 5, 2016.

(30) Foreign Application Priority Data

Dec. 10, 2015 (JP) ................................ 2015-241437

(51) Int. Cl.
  *G07C 9/00* (2006.01)
  *B60R 25/24* (2013.01)
  *B60R 25/20* (2013.01)
  *E05B 81/78* (2014.01)

(52) U.S. Cl.
  CPC .......... *G07C 9/00309* (2013.01); *B60R 25/20* (2013.01); *B60R 25/245* (2013.01); *E05B 81/78* (2013.01); *G07C 2009/00373* (2013.01); *G07C 2009/00555* (2013.01)

(58) Field of Classification Search
  CPC ...... G07C 9/00309; G07C 2009/00373; B60R 25/245; B60R 25/20; E05B 81/78
  See application file for complete search history.

(56) References Cited

U.S. PATENT DOCUMENTS 6,552,649 B1 4/2003 Okada et al.
9,349,236 B2 * 5/2016 Mutti ..................... B60R 25/24
(Continued)

FOREIGN PATENT DOCUMENTS

JP 2000-073635 A 3/2000

OTHER PUBLICATIONS

International Search Report of PCT application No. PCT/JP2016/005058 dated Feb. 7, 2017.

*Primary Examiner* — Thomas D Alunkal
(74) *Attorney, Agent, or Firm* — Seed IP Law Group LLP

(57) ABSTRACT

An on-vehicle device includes: a communication unit capable of executing communication using a first communication scheme; a transmitter that transmits a request signal and a measurement signal to a mobile device, using a second communication scheme different from the first communication scheme of the communication unit; and a receiver that receives a response signal from the mobile device that has received the request signal and the measurement signal transmitted from the transmitter. The transmitter changes a number of times of transmission of the measurement signal transmitted subsequently to the request signal based on whether or not the communication of the communication unit is in a connected state.

3 Claims, 25 Drawing Sheets

(56) References Cited

U.S. PATENT DOCUMENTS

| | | | | |
|---|---|---|---|---|
| 2014/0169193 A1* | 6/2014 | Eder | ............... | H04L 43/08 |
| | | | | 370/252 |
| 2014/0330449 A1* | 11/2014 | Oman | ............... | G01S 13/765 |
| | | | | 701/2 |
| 2014/0340193 A1* | 11/2014 | Zivkovic | ............ | G07C 9/00111 |
| | | | | 340/5.61 |
| 2015/0082427 A1* | 3/2015 | Ivanchykhin | ........... | H04L 63/08 |
| | | | | 726/22 |
| 2016/0071344 A1* | 3/2016 | Liu | ............... | B60R 25/24 |
| | | | | 340/5.61 |
| 2016/0332597 A1* | 11/2016 | Tokunaga | ............... | B60R 25/24 |
| 2017/0008488 A1* | 1/2017 | Matsumoto | ........... | H04W 12/06 |
| 2017/0158169 A1* | 6/2017 | Luo | ............... | B60R 25/245 |
| 2018/0084371 A1* | 3/2018 | Scagnol | ............... | G01S 5/0205 |

* cited by examiner

ON-VEHICLE DEVICE

FIRST REPEATER

SECOND REPEATER

MOBILE DEVICE

52

| RECEPTION STRENGTH RANGE | TRANSMISSION STRENGTH | RANDOM VALUE |
|---|---|---|
| A | −50% | 0000 ~ 2499 |
| B | −25% | 2500 ~ 4999 |
| C | +25% | 5000 ~ 7499 |
| D | +50% | 7500 ~ 9999 |

64

ON-VEHICLE DEVICE, MOBILE DEVICE, AND VEHICLE WIRELESS COMMUNICATION SYSTEM

This application is a continuation application of the PCT International Application No. PCT/JP2016/005058 filed on Dec. 5, 2016, which claims the benefit of foreign priority of Japanese patent application 2015-241437 filed on Dec. 10, 2015, the contents all of which are incorporated herein by reference.

BACKGROUND

1. Technical Field

The present disclosure relates to a communication technique. More particularly, the present disclosure relates to an on-vehicle device that executes communication between the on-vehicle device mounted on a vehicle and a mobile device possessed by a user, the mobile device and a vehicle wireless communication system.

2. Description of the Related Art

Electronic key systems include a smart entry system that does not need a button operation of an electronic key. In this system, a communication area for a request in a low-frequency (LF) band is formed around a vehicle. When the electronic key enters this communication area and receives a request, the electronic key returns a response in a radio-frequency (RF) band to a vehicle. Both of the vehicle side and the electronic key side in this system include communication functions that support a communication system that uses a higher frequency than the LF band. The vehicle side does not form the communication area in the LF band in an initial state, and forms the communication area in the LF band when confirming connection with the electronic key by the communication function (see, for example, Unexamined Japanese Patent Publication No. 2000-73635).

SUMMARY

When an electronic key does not have the above-described communication function, the communication function is provided to, for example, smartphones or mobile telephone terminals (referred to as "wireless terminal devices" hereinafter). In this case, a user possesses the wireless terminal device and the electronic key to use an electronic key system. Under such circumstances, even when the user does not possess the wireless terminal device, the electronic key system needs to be available. On the other hand, unauthorized use of the smart entry system includes a relay attack. In the relay attack, a malicious third party uses a repeater that can relay a request from a vehicle and a response from an electronic key. Therefore, even when the electronic key is not in a communication area of the vehicle, communication can be performed between two parties.

The present disclosure has been made in light of such a situation. An object of the present disclosure is to provide a technique of reducing a risk of a relay attack related to door unlocking irrespectively of whether or not a user possesses a wireless terminal device.

To solve the above problem, an on-vehicle device according to one aspect of the present disclosure includes: a communication unit that is capable of executing communication using a first communication scheme; a transmitter that transmits a request signal and a measurement signal to a mobile device, using a second communication scheme different from the first communication scheme of the communication unit; and a receiver that receives a response signal from the mobile device that has received the request signal and the measurement signal transmitted from the transmitter. The transmitter changes a number of times of transmission of the measurement signal transmitted subsequently to the request signal based on whether or not the communication of the communication unit is in a connected state.

Another aspect of the present disclosure is a mobile device. The mobile device includes: a receiver that receives a request signal and a measurement signal from an on-vehicle device, using a second communication scheme different from a first communication scheme; and a transmitter that transmits a response signal to the on-vehicle device when the receiver receives the request signal and the measurement signal. The receiver changes a number of times of reception of the measurement signal received subsequently to the request signal based on whether or not communication of the on-vehicle device using the first communication scheme is in a connected state.

Still another aspect of the present disclosure is a vehicle wireless communication system. The vehicle wireless communication system includes: an on-vehicle device that is capable of executing communication using a first communication scheme and transmits a request signal and a measurement signal using a second communication scheme different from the first communication scheme; and a mobile device that transmits a response signal to the on-vehicle device when receiving the request signal and the measurement signal. The on-vehicle device changes a number of times of transmission of the measurement signal transmitted subsequently to the request signal based on whether or not the communication of the first communication scheme is in a connected state.

Any combinations of the above-described components and modifications of the features of the present disclosure in methods, devices, systems, recording media, and computer programs are still effective as other aspects of the present disclosure.

According to the present disclosure, it is possible to reduce a risk of a relay attack during door unlocking irrespectively of whether or not a user possesses a wireless terminal device.

DETAILED DESCRIPTION

First Exemplary Embodiment

Figure 1A:
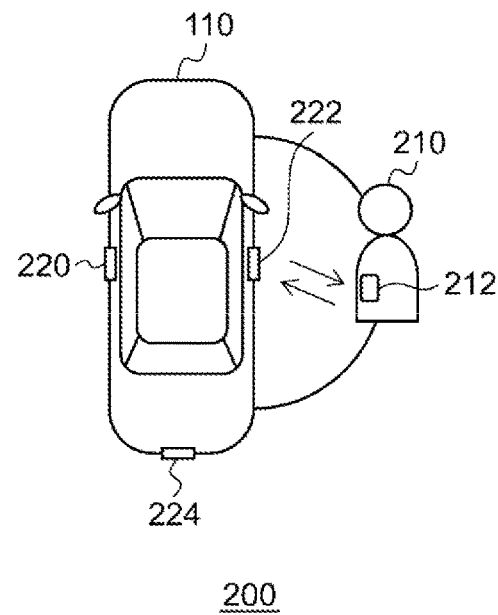
FIG. 1A is a view illustrating a configuration of a vehicle wireless communication system according to a comparative example of a first exemplary embodiment of the present disclosure.

Prior to specific description of a technique according to the present disclosure, an outline of the present disclosure will be described herein. A first exemplary embodiment according to the present disclosure relates to a vehicle wireless communication system that executes communication for unlocking doors of a vehicle between an on-vehicle device that is mounted on the vehicle and a mobile device (electronic key) that is possessed by a user. Adding a wireless terminal device to the vehicle wireless communication system reduces a risk of a relay attack during door unlocking. More specifically, when the wireless terminal device and the on-vehicle device are not connected, the on-vehicle device and the mobile device do not communicate. Therefore, when a repeater is used under a situation that the wireless terminal device is away from the on-vehicle device, the door is not unlocked. However, even when the user does not possess the wireless terminal device, it is necessary to unlock the doors by using only the mobile device while reducing the risk of the relay attack. To meet this necessity, the present exemplary embodiment executes following process.

The on-vehicle device according to the present exemplary embodiment changes a number of times of transmission of a measurement signal, as described below, based on whether or not the on-vehicle device is connected with the wireless terminal device to change a procedure of communication with the mobile device. When the on-vehicle device is not connected with the wireless terminal device, the on-vehicle device transmits a measurement signal (a measurement signal transmitted at this timing will be referred to as a "first measurement signal" hereinafter) subsequently to a request signal. When receiving the request signal, the mobile device wakes up, and measures reception strength of the first measurement signal. The mobile device determines transmission strength of a measurement signal (referred to as a "second measurement signal" hereinafter) that the on-vehicle device needs to transmit next, based on the measured reception strength. The mobile device transmits a response signal (a response signal transmitted at this timing will be referred to as a "first response signal" hereinafter) including information on the determined transmission strength.

When receiving the first response signal, the on-vehicle device extracts the information on the transmission strength included in the first response signal, and transmits the second measurement signal having the transmission strength based on the information on the transmission strength. The mobile device measures reception strength of the second measurement signal. When determining that the measured reception strength is within a predicted range of the reception strength predicted based on the information on the transmission strength included in the first response signal, the mobile device transmits a response signal (a response signal transmitted at this timing will be referred to as a "second response signal" hereinafter). When receiving the second response signal, the on-vehicle device unlocks the doors of the vehicle. When the on-vehicle device is connected with the wireless terminal device, the on-vehicle device transmits the first measurement signal subsequently to the request signal. When receiving the first response signal from the mobile device, the on-vehicle device unlocks the doors of the vehicle. In this case, the second measurement signal and the second response signal are not transmitted. In addition, although not described in detail in the present exemplary embodiment, the on-vehicle device may unlock the doors and then automatically open the unlocked doors.

Figure 1B:
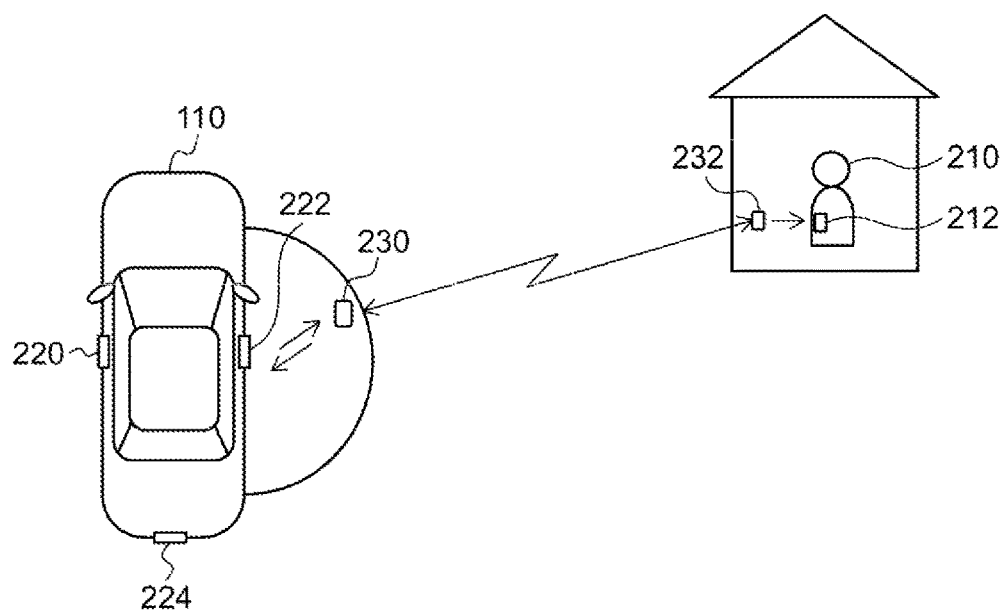
FIG. 1B is a view illustrating the configuration of the vehicle wireless communication system according to the comparative example of the first exemplary embodiment of the present disclosure.

FIGS. 1A and 1B are views illustrating a configuration of vehicle wireless communication system 200 according to a comparative example of the first exemplary embodiment of the present disclosure. FIG. 1A illustrates a normal unlocking operation of vehicle wireless communication system 200. Vehicle wireless communication system 200 includes left side antenna 220, right side antenna 222, and rear antenna 224 that are disposed in vehicle 110, and user 210 possesses mobile device 212. Further, left side antenna 220, right side antenna 222, and rear antenna 224 are connected with the on-vehicle device mounted on vehicle 110. In this regard, left side antenna 220, right side antenna 222, and rear antenna 224 transmit LF signals such as signals of a 125 kHz band, and mobile device 212 receives the LF signals. Further, mobile device 212 transmits ultra high frequency (UHF) signals such as signals of a 300 MHz band, and left side antenna 220, right side antenna 222 and rear antenna 224 receive the UHF signals.

Vehicle wireless communication system 200 corresponds to the above-described smart entry system. The smart entry system is also referred to as a smart key system or a passive keyless entry (PKE) system. In these systems, mobile device 212 receives the LF signal from the on-vehicle device mounted on vehicle 110, and returns the UHF signal when the LF signal is from the correct on-vehicle device. Thus, mobile device 212 automatically makes a response, and causes vehicle 110 to unlock the doors. In addition, the LF signal and the UHF signal are encrypted, and it is difficult to decrypt data included in these signals. Further, a communication distance of the LF signal transmitted from the on-vehicle device is limited to a range of approximately 2 m from vehicle 110. Therefore, mobile device 212 distant from vehicle 110 does not make a response by mistake.

FIG. 1B illustrates an operation in a case where there is a relay attack on vehicle wireless communication system 200. For the relay attack, first repeater 230 and second repeater 232 are disposed between mobile device 212 and left side antenna 220, right side antenna 222, and rear antenna 224. In this regard, first repeater 230 and second repeater 232 are disposed by a third party other than user 210 who is an owner of vehicle 110. In the relay attack, first repeater 230 and second repeater 232 relay signals between the on-vehicle device and mobile device 212, and the doors of vehicle 110 are unlocked irrespectively of intention of user 210.

The LF signals transmitted from left side antenna 220, right side antenna 222, and rear antenna 224 are received by first repeater 230, and are converted into the UHF signals. The UHF signals from first repeater 230 are received by second repeater 232, and are converted into the LF signals. The LF signals from second repeater 232 are received by mobile device 212. Generally, the LF signal has a short communication distance and therefore the frequency is converted between first repeater 230 and second repeater 232 into a UHF signal having a long communication distance.

Figure 2A:
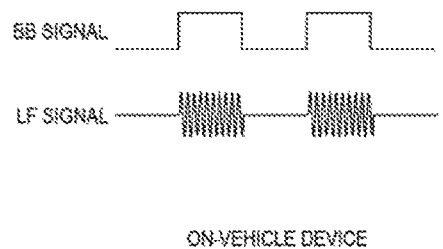
FIG. 2A is a view illustrating signals used by the vehicle wireless communication system in FIG. 1B.
Figure 2B:
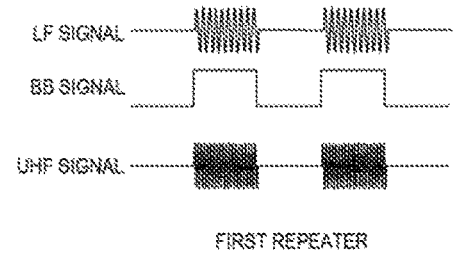
FIG. 2B is a view illustrating signals used by the vehicle wireless communication system in FIG. 1B.
Figure 2C:
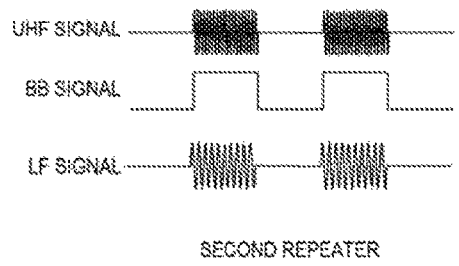
FIG. 2C is a view illustrating signals used by the vehicle wireless communication system in FIG. 1B.
Figure 2D:
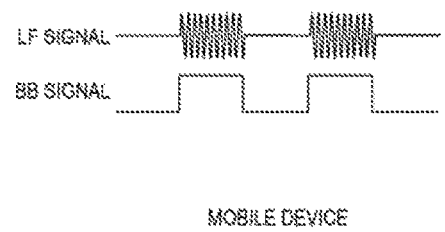
FIG. 2D is a view illustrating signals used by the vehicle wireless communication system in FIG. 1B.

The signals in this case will be described in more detail with reference to FIGS. 2A to 2D. FIGS. 2A to 2D are views illustrating signals used by vehicle wireless communication system 200 in FIG. 1B. Particularly, FIG. 2A illustrates the signals at the on-vehicle device. FIG. 2B illustrates the signals at first repeater 230. FIG. 2C illustrates the signals at second repeater 232. FIG. 2D illustrates the signals at mobile device 212. An upper part of FIG. 2A illustrates a baseband signal (BB signal) generated by the on-vehicle device. A lower part of FIG. 2A illustrates the LF signal modulated based on the baseband signal by the on-vehicle device. The LF signals are transmitted from left side antenna 220, right side antenna 222, and rear antenna 224.

An upper part of FIG. 2B illustrates the LF signal received by first repeater 230. A middle part of FIG. 2B illustrates the baseband (BB) signal obtained by demodulating the LF signal by first repeater 230. A lower part of FIG. 2B illustrates the UHF signal modulated based on the baseband signal by first repeater 230. The UHF signal is transmitted from first repeater 230.

An upper part of FIG. 2C illustrates the UHF signal received by second repeater 232. A middle part of FIG. 2C illustrates the baseband signal obtained by demodulating the UHF signal by second repeater 232. A lower part of FIG. 2C illustrates the LF signal modulated based on the baseband signal by second repeater 232. The LF signal is transmitted from second repeater 232. An upper part of FIG. 2D illustrates the LF signal received by mobile device 212. A lower part of FIG. 2D illustrates the baseband signal obtained by demodulating the LF signal by mobile device 212. Description goes back to FIG. 1B.

On the other hand, the UHF signal from mobile device 212 may be relayed at second repeater 232 and first repeater 230 and received at left side antenna 220, right side antenna 222, or rear antenna 224, or may be directly received by left side antenna 220, right side antenna 222, or rear antenna 224 without being relayed. Thus, only first repeater 230 and second repeater 232 are disposed between the on-vehicle device and mobile device 212, and the on-vehicle device and mobile device 212 execute the same process as the process in FIG. 1A. Consequently, even without reverse engineering of the encryption, first repeater 230 and second repeater 232 can unlock vehicle 110.

Figure 3:
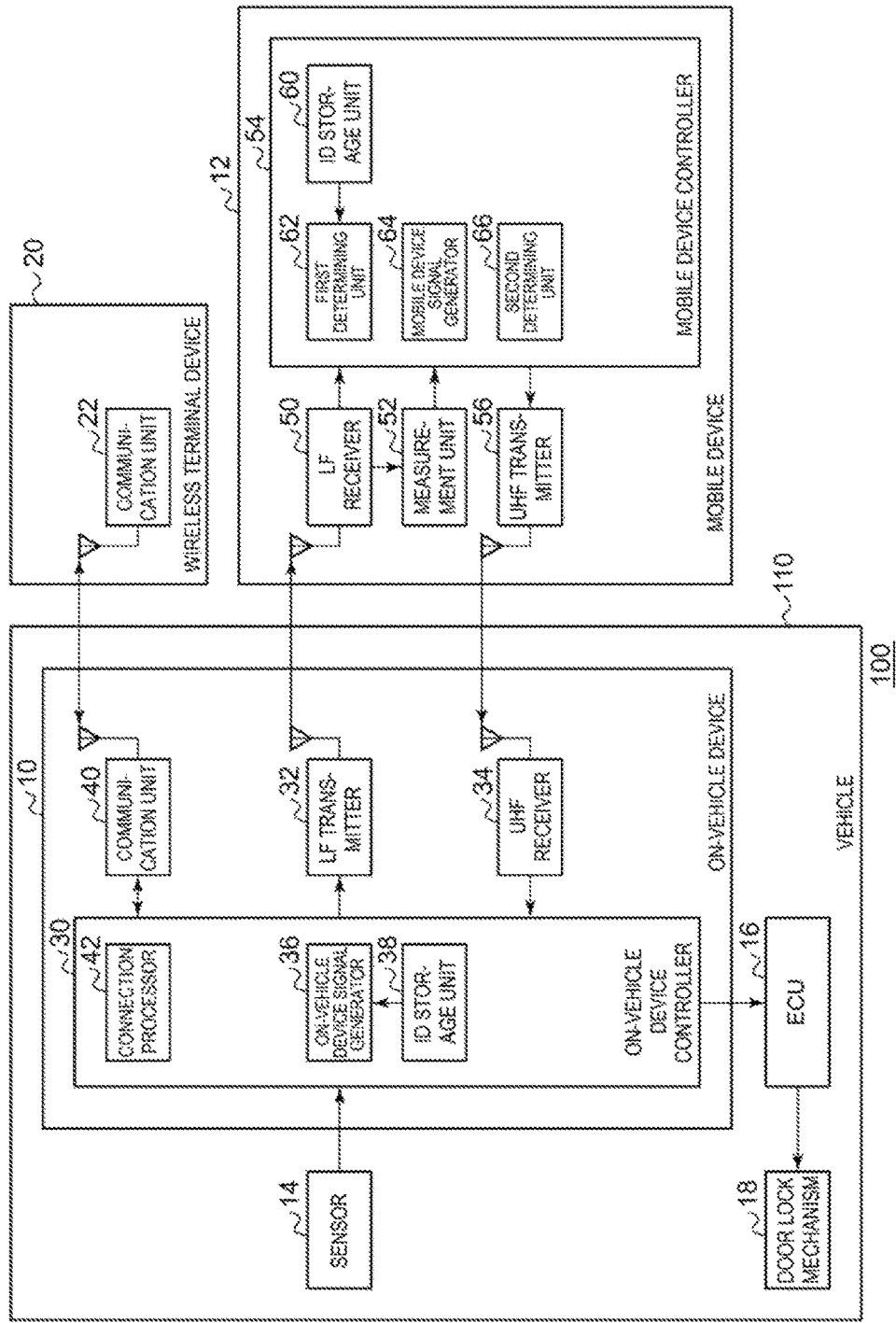
FIG. 3 is a view illustrating a configuration of a vehicle wireless communication system according to the first exemplary embodiment of the present disclosure.

FIG. 3 is a view illustrating a configuration of vehicle wireless communication system 100 according to the first exemplary embodiment of the present disclosure. Vehicle wireless communication system 100 includes vehicle 110, mobile device 12, and wireless terminal device 20. Vehicle 110 includes on-vehicle device 10, sensor 14, electronic central unit (ECU) 16, and door lock mechanism 18. On-vehicle device 10 includes on-vehicle device controller 30, LF transmitter 32, UHF receiver 34, and communication unit 40. On-vehicle device controller 30 includes on-vehicle device signal generator 36, identification (ID) storage unit 38, and connection processor 42. Mobile device 12 includes LF receiver 50, measurement unit 52, mobile device controller 54, and UHF transmitter 56. Mobile device controller 54 includes ID storage unit 60, first determining unit 62, mobile device signal generator 64, and second determining unit 66. Wireless terminal device 20 includes communication unit 22.

As described above, wireless terminal device 20 is a smartphone or a mobile telephone terminal, and executes communication via a mobile telephone communication network or a wireless metropolitan area network (WMAN), for example. Further, wireless terminal device 20 includes communication unit 22 in addition to these communication functions. Communication unit 22 can execute communication that supports short-range wireless communication standards such as Bluetooth (registered trademark that is applied likewise hereinafter) and Bluetooth-LE (Low Energy).

Figure 4:
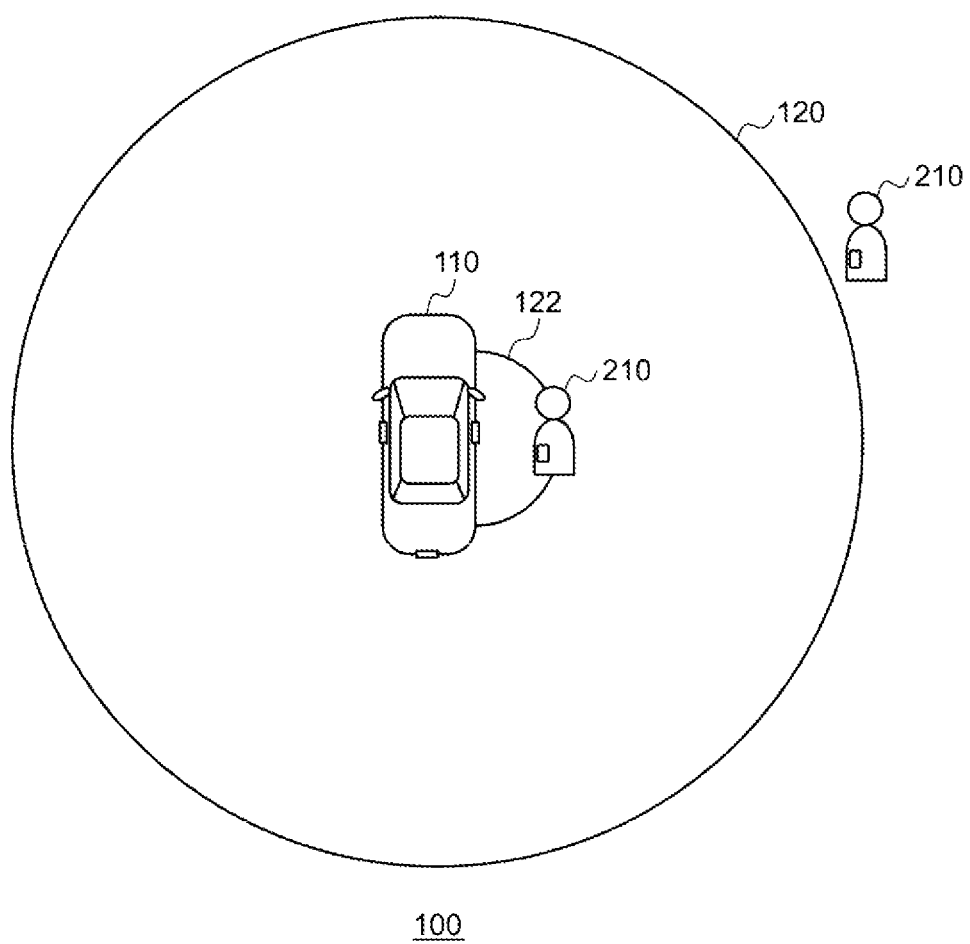
FIG. 4 is another view illustrating the configuration of the vehicle wireless communication system in FIG. 3.

FIG. 4 is another view illustrating the configuration of vehicle wireless communication system 100. As illustrated in FIG. 4, short-range wireless communication area 120 is formed around vehicle 110. Short-range wireless communication area 120 is an area that allows execution of short-range wireless communication such as Bluetooth and Bluetooth-LE (Low Energy). Further, LF communication area 122 narrower than short-range wireless communication area 120 is also formed around vehicle 110. LF communication area 122 is an area that allows execution of communication using an LF signal. The description returns to FIG. 3.

Communication unit 40 of on-vehicle device 10 employs the same configuration as the configuration of communication unit 22. When communication unit 40 and communication unit 22 are distant at a maximum transmission distance or more according to the short-range wireless communication standards, communication unit 40 and communication unit 22 are not connected with each other. On the other hand, when the user who possesses wireless terminal device 20 comes close to vehicle 110, and thereby communication unit 40 and communication unit 22 come close to each other at the maximum transmission distance according to the short-range wireless communication standards or less, communication unit 40 and communication unit 22 are connected and can communicate with each other. On a side of on-vehicle device 10, connection processor 42 controls a connection process and a disconnection process between communication unit 40 and communication unit 22. Any publicly known technique is applicable to these processes, and therefore, description of the processes will be omitted herein. Connection processor 42 manages whether communication unit 40 is in a state of connection with communication unit 22 (referred to as a "connected state" hereinafter) or communication unit 40 is not in the state of the connection with communication unit 22 (referred to as a "non-connected state" hereinafter).

Sensor 14 of vehicle 110 is provided to, for example, a door knob of vehicle 110, and detects a user's touch. Any publicly known technique only needs to be used for sensor 14, and therefore, description thereof will be omitted herein. When detecting a touch, sensor 14 notifies on-vehicle device controller 30 of the detection.

When receiving the notification from sensor 14, on-vehicle device controller 30 of on-vehicle device 10 obtains the state managed by connection processor 42. Hence, on-vehicle device controller 30 learns whether the communication is in the connected state or in the non-connected state. Further, on-vehicle device controller 30 instructs on-vehicle device signal generator 36 to generate a signal. When receiving the instruction from on-vehicle device controller 30, on-vehicle device signal generator 36 extracts an ID (identification code) stored in ID storage unit 38, and generates a request signal including the ID. This ID is identification information used for pair authentication with mobile device 12. In addition, when being included in the request signal, the ID may be encrypted. Further, the request signal may include information (referred to as "connection information" hereinafter) indicating whether the communication is in the connected state or in the non-connected state. Herein, the request signal generated by on-vehicle device signal generator 36 is a baseband signal. On-vehicle device signal generator 36 outputs the request signal to LF transmitter 32.

LF transmitter 32 receives the request signal from on-vehicle device signal generator 36. LF transmitter 32 executes a modulation process on the request signal to generate a request signal (that will be also referred to as the "request signal" hereinafter) of an LF signal. LF transmitter 32 transmits the request signal from an antenna to mobile device 12. In this regard, a communication scheme used by LF transmitter 32 is different from a communication scheme used by communication unit 40. Hence, the former will be referred to as a first communication scheme, and the latter will be referred to as a second communication scheme. Further, a frequency of the first communication scheme is lower than a frequency of the second communication scheme. In addition, the antenna connected with LF transmitter 32 and an antenna connected with UHF receiver 34 described below are disposed similar to left side antenna 220, right side antenna 222, and rear antenna 224 in FIGS. 1A and 1B.

Hereinafter, (1) a process in the non-connected state will be described, and then (2) a process in the connected state will be described.

(1) Process in Non-Connected State

Figure 5:
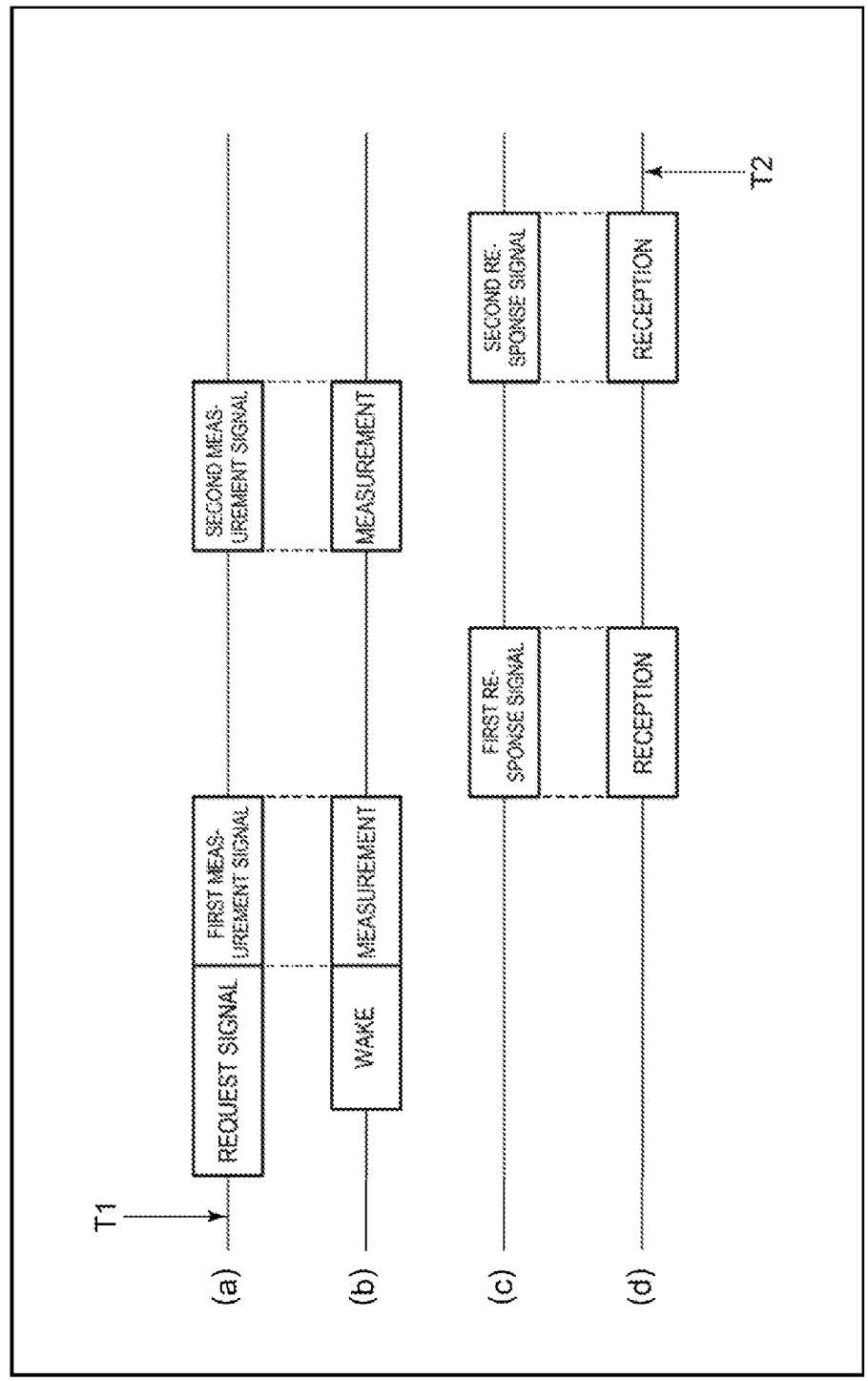
FIG. 5 is a view illustrating signals used by the vehicle wireless communication system in FIG. 3.
Figure 6:
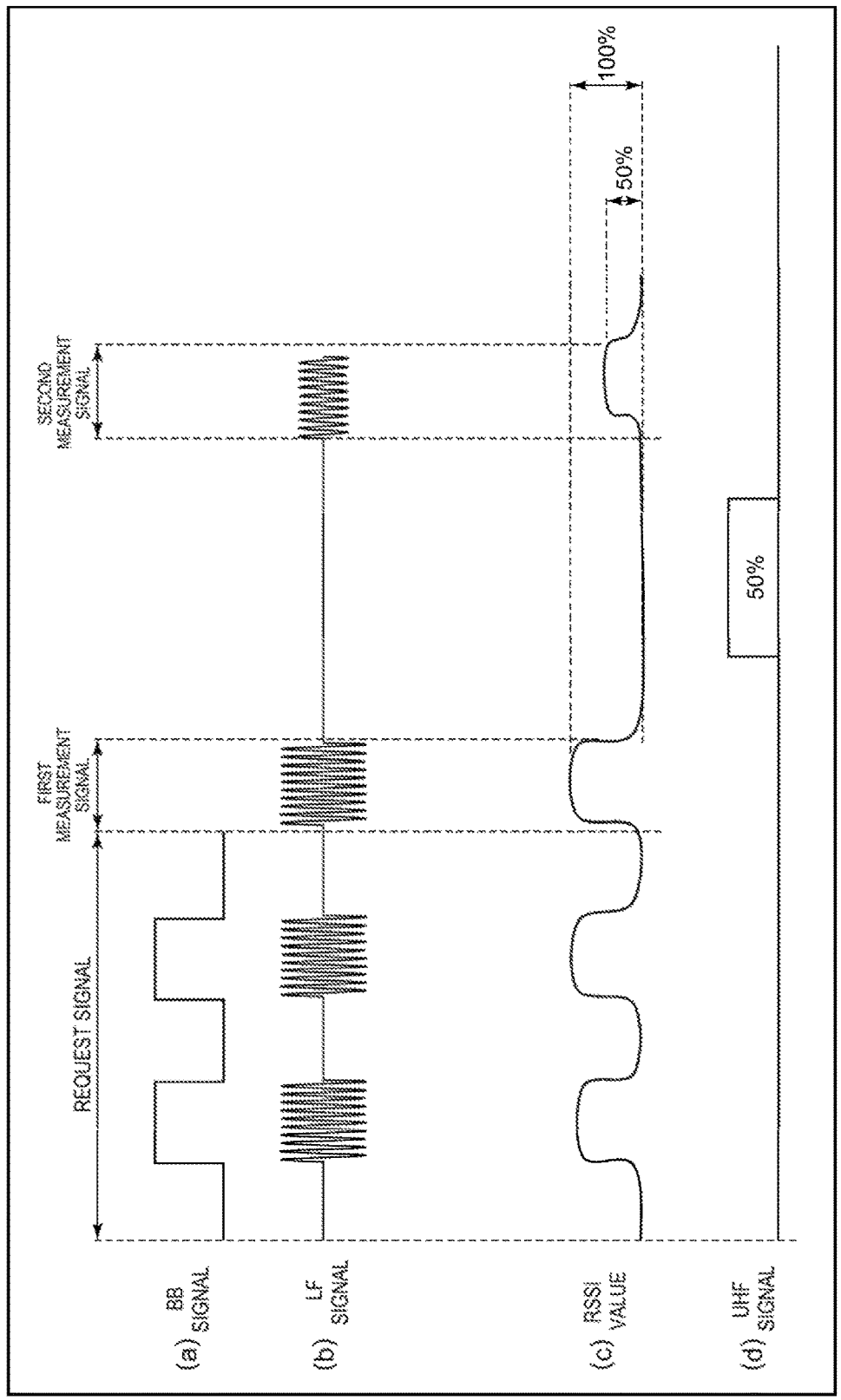
FIG. 6 is another view illustrating signals used by the vehicle wireless communication system in FIG. 3.

LF transmitter 32 transmits the request signal and then transmits the first measurement signal to mobile device 12. The first measurement signal is a signal for causing mobile device 12 to measure reception strength, and is an LF signal. FIG. 5 is a view illustrating signals used by vehicle wireless communication system 100. Particularly, part (a) of FIG. 5 illustrates the LF signal transmitted from LF transmitter 32 of on-vehicle device 10. When receiving the notification from sensor 14 at timing "TI", on-vehicle device 10 successively transmits the request signal and the first measurement signal. Other points will be described below. FIG. 6 is another view illustrating signals used by vehicle wireless communication system 100. Part (a) of FIG. 6 illustrates a request signal generated by on-vehicle device signal generator 36. The request signal is a baseband signal as illustrated in part (a) of FIG. 6. Part (b) of FIG. 6 illustrates the LF signal transmitted from LF transmitter 32. As illustrated in part (b) of FIG. 6, the first measurement signal is transmitted subsequently to the request signal modulated to the LF signal. The other points will be described below, and the description returns to FIG. 3.

LF receiver 50 of mobile device 12 receives the request signal from on-vehicle device 10, and receives the first measurement signal from on-vehicle device 10. LF receiver 50 demodulates the received request signal, and generates a request signal (that will be also referred to as the "request signal" hereinafter) of a baseband signal. LF receiver 50 outputs the request signal to mobile device controller 54. When receiving the request signal from LF receiver 50, mobile device controller 54 wakes up mobile device 12.

Figures 7, 8:
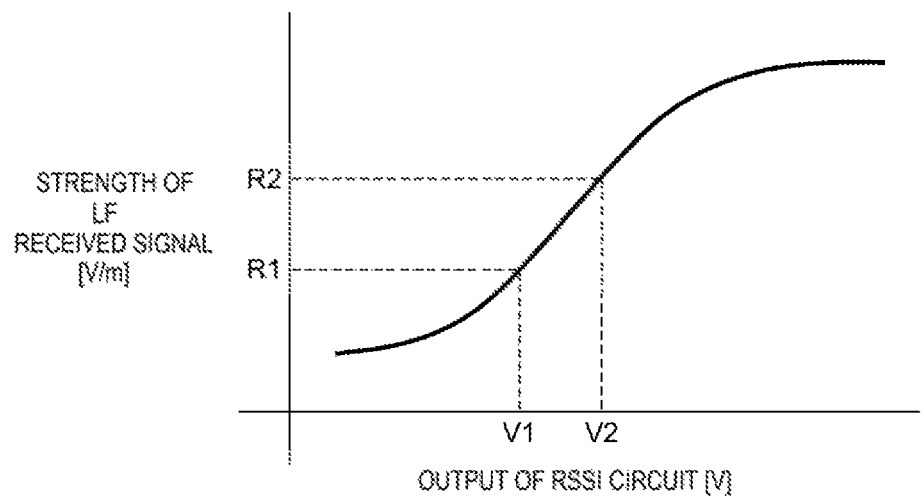
FIG. 7 is a view illustrating characteristics of a received signal strength indicator (RSSI) circuit included in a measurement unit in FIG. 3.
FIG. 8 illustrates a data structure of a table stored in a mobile device signal generator in FIG. 3.

Subsequently, LF receiver 50 outputs the received first measurement signal to measurement unit 52. Measurement unit 52 measures reception strength of the first measurement signal such as a received signal strength indicator (RSSI). FIG. 7 is a view illustrating characteristics of an RSSI circuit included in measurement unit 52. As illustrated in FIG. 7, strength (electric field strength [V/m]) of the received LF signal is associated with an output (voltage [V]) of the RSSI circuit. For example, when the strength of the received LF signal is "R1", the RSSI circuit outputs "V1". When the strength of the LF received signal is "R2", the RSSI circuit outputs "V2". The description returns to FIG. 3. Measurement unit 52 outputs the measured reception strength to mobile device controller 54.

Part (b) of FIG. 5 illustrates a processing of the LF signal received by LF receiver 50 of mobile device 12. A wake-up operation is executed upon receiving the request signal, and the first measurement signal is measured. Part (c) of FIG. 6 illustrates a measurement result of measurement unit 52 of mobile device 12. As illustrated in part (c) of FIG. 6, part of the request signal and the first measurement signal have the higher reception strength when the LF signal is transmitted. The description returns to FIG. 3.

In mobile device controller 54, first determining unit 62 extracts the ID included in the request signal. Further, first determining unit 62 obtains the ID stored in ID storage unit 60. Furthermore, first determining unit 62 executes pair authentication based on the extracted ID and the obtained ID. Any publicly known technique only needs to be used for the pair authentication, and therefore, description thereof will be omitted herein. When the pair authentication fails, a process described below is not executed. On the other hand, when the pair authentication succeeds, the process described below is executed. In addition, mobile device controller 54 recognizes that the communication is in the non-connected state, based on the connection information included in the request signal.

Mobile device signal generator 64 receives the reception strength from measurement unit 52. Mobile device signal generator 64 determines transmission strength with respect to transmission strength of the second measurement signal based on the reception strength. FIG. 8 illustrates a data structure of a table stored in mobile device signal generator 64. A "reception strength range" indicates a range including the reception strength measured by measurement unit 52. Herein, "A" indicates a range including maximum reception strength. "D" indicates a range including minimum reception strength. In addition, each of the reception strength ranges "A" to "D" is set based on the characteristics of the RSSI circuit included in measurement unit 52 illustrated in FIG. 7. Further, "transmission strength" is transmission strength associated with each reception strength range, and indicates the transmission strength of the second measurement signal. As the reception strength of each reception strength range becomes higher, a value of the transmission strength becomes smaller. In addition, the transmission strength "100%" corresponds to the transmission strength of the first measurement signal. A "random value" indicates a value for instructing each transmission strength. As illustrated in FIG. 8, a plurality of values is defined for one transmission strength, and one random value is selected from the plurality of values.

Mobile device signal generator 64 specifies the reception strength range including the input reception strength to specify the transmission strength. Further, mobile device signal generator 64 selects one value from the plurality of values associated with the specified transmission strength at random. The selected random value is information (referred to as "transmission strength information" hereinafter) related to the transmission strength of the second measurement signal. Therefore, it can be said that the transmission strength information is randomized information. The description returns to FIG. 3. Mobile device signal generator 64 generates the first response signal including information (referred to as "transmission strength information" hereinafter) related to the transmission strength of the second measurement signal. In addition, when being included in the first response signal, the transmission strength information may be encrypted. In addition, the first response signal generated by mobile device signal generator 64 is a baseband signal. Mobile device signal generator 64 outputs the first response signal to UHF transmitter 56.

UHF transmitter 56 receives the first response signal from mobile device signal generator 64. UHF transmitter 56 executes a modulation process on the first response signal to generate a first response signal (that will be also referred to as the "first response signal" hereinafter) of a UHF signal. UHF transmitter 56 transmits the first response signal from the antenna to on-vehicle device 10. Part (c) of FIG. 5 illustrates the UHF signal transmitted from UHF transmitter 56 of mobile device 12. The first measurement signal is received by mobile device 12, and then the first response signal is transmitted. Part (d) of FIG. 6 illustrates the first response signal transmitted from UHF transmitter 56 of mobile device 12. In this regard, for example, the transmission strength information is set to "50%". The description returns to FIG. 3.

UHF receiver 34 of on-vehicle device 10 receives the first response signal from mobile device 12. UHF receiver 34 demodulates the received first response signal to generate a first response signal (that will be also referred to as the "first response signal" hereinafter) of a baseband signal. UHF receiver 34 outputs the first response signal to on-vehicle device controller 30. Part (d) of FIG. 5 illustrates a processing of the UHF signal received by UHF receiver 34 of on-vehicle device 10. As illustrated in part (d) of FIG. 5, the first response signal is received. The description returns to FIG. 3.

On-vehicle device controller 30 receives the first response signal from UHF receiver 34. On-vehicle device controller 30 extracts the transmission strength information included in the first response signal. On-vehicle device controller 30 stores the table illustrated in FIG. 8. When the transmission strength information is indicated by a random value, on-vehicle device controller 30 refers to the table and thereby converts the random value into the transmission strength. On-vehicle device controller 30 sets the transmission strength to LF transmitter 32. LF transmitter 32 transmits the second measurement signal to mobile device 12 based on the transmission strength set by on-vehicle device controller 30. In part (a) of FIG. 5, the second measurement signal is transmitted subsequently to the first response signal. Further, part (b) of FIG. 6 illustrates the second measurement signal set to 50% of the transmission strength of the first measurement signal. The description returns to FIG. 3.

LF receiver 50 of mobile device 12 receives the second measurement signal from on-vehicle device 10. Subsequently, LF receiver 50 outputs the received second measurement signal to measurement unit 52. Measurement unit 52 measures reception strength of the second measurement signal. Measurement unit 52 outputs the measured reception strength to mobile device controller 54. In part (b) of FIG. 5, the second measurement signal is measured. In part (c) in FIG. 6, reception strength that is 50% of the reception strength of the first measurement signal is measured for the second measurement signal. The description returns to FIG. 3.

Mobile device signal generator 64 receives a value such as "50%" of the transmission strength information generated by mobile device signal generator 64. Further, mobile device controller 54 multiplies the reception strength of the first measurement signal by the value of the transmission strength information to predict reception strength of the second measurement signal. Furthermore, mobile device controller 54 sets a predicted range around the predicted reception strength. In this regard, the predicted range is set from, for example, a subtraction result to an addition result by subtracting a fixed value from the predicted reception strength and adding the fixed value to the predicted reception strength.

After the predicted range is set in this way, mobile device controller 54 checks whether or not the reception strength that is input from measurement unit 52 and is the reception strength of the second measurement signal is within the predicted range. When the reception strength is not within the predicted range, a process described below is not executed. On the other hand, when the reception strength is within the predicted range, the process described below is executed. When the reception strength is within the predicted range, mobile device signal generator 64 generates a second response signal. Hence, the second response signal is generated based on a result of determining the second measurement signal. It can be said that the second response signal is a signal for notifying on-vehicle device 10 of that the reception strength is within the predicted range. Mobile device signal generator 64 outputs the second response signal to UHF transmitter 56.

UHF transmitter 56 receives the second response signal from mobile device signal generator 64. UHF transmitter 56 executes a modulation process on the second response signal to generate a second response signal (that will be also referred to as the "second response signal" hereinafter) of the UHF signal. UHF transmitter 56 transmits the second response signal from the antenna to on-vehicle device 10. In part (c) of FIG. 5, the second measurement signal is received by mobile device 12, and then the second response signal is transmitted. The description returns to FIG. 3.

UHF receiver 34 of on-vehicle device 10 receives the second response signal from mobile device 12. UHF receiver 34 demodulates the received second response signal to generate a second response signal (that will be also referred to as the "second response signal" hereinafter) of the baseband signal. UHF receiver 34 outputs the second response signal to on-vehicle device controller 30. As illustrated in part (d) of FIG. 5, the second response signal is received. The description returns to FIG. 3.

On-vehicle device controller 30 receives the second response signal from UHF receiver 34. When receiving the input of the second response signal, on-vehicle device controller 30 instructs ECU 16 of vehicle 110 to unlock door lock mechanism 18. Any publicly known technique only needs to be used for ECU 16 and door lock mechanism 18, and therefore, description thereof will be omitted herein.

Hereinafter, a process of deriving the transmission strength of the second measurement signal from the reception strength of the first measurement signal in mobile device 12 will be described in more detail. As illustrated in FIG. 7, in measurement unit 52 of mobile device 12, the RSSI circuit saturates in a region in which the received signal strength is high, and goes below a lower limit of measurement in an area in which the received signal strength is low and therefore cannot perform accurate measurement. In this regard, a case of the high received signal strength corresponds to a case in which a distance between on-vehicle device 10 and mobile device 12 is short. A case of the low received signal strength corresponds to a case in which the distance between on-vehicle device 10 and mobile device 12 is long. Hence, as described above, when the reception strength of the first measurement signal is high, mobile device signal generator 64 sets the transmission strength of the second measurement signal lower than the transmission strength of the first measurement signal. Further, when the reception strength of the first measurement signal is low, mobile device signal generator 64 sets the transmission strength of the second measurement signal higher than the transmission strength of the first measurement signal.

Figure 9A:
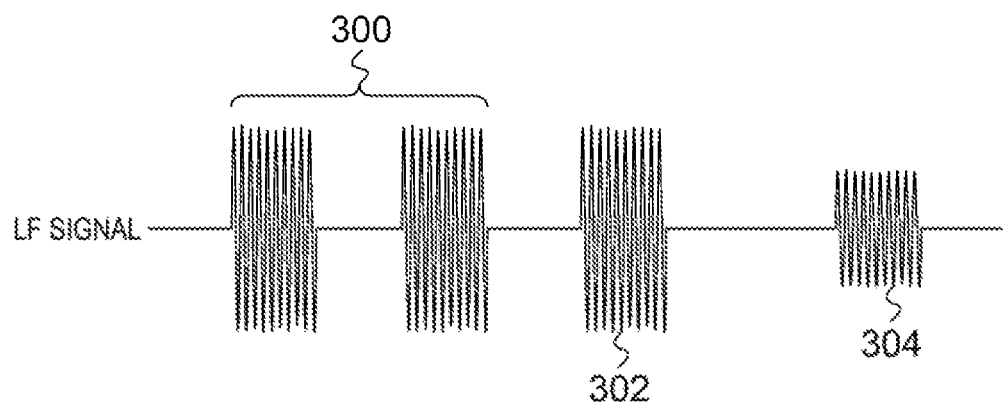
FIG. 9A is still another view illustrating a signal used by the vehicle wireless communication system in FIG. 3.
Figure 9B:
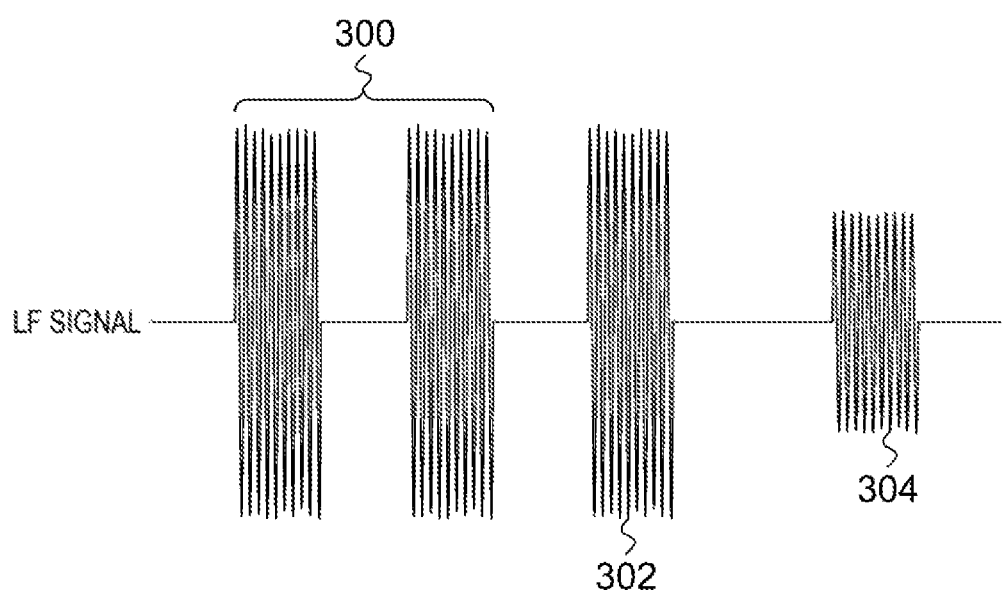
FIG. 9B is still another view illustrating a signal used by the vehicle wireless communication system in FIG. 3.

FIGS. 9A to 9D are still other views illustrating signals used by vehicle wireless communication system 100. FIGS. 9A and 9B illustrate the case in which the distance between on-vehicle device 10 and mobile device 12 is short. FIG. 9A illustrates an LF signal transmitted from on-vehicle device 10. FIG. 9B illustrates an LF signal received by mobile device 12. As illustrated in FIG. 9A, on-vehicle device 10 transmits request signal 300 and first measurement signal 302. As illustrated in FIG. 9B, mobile device 12 receives request signal 300 and first measurement signal 302. Reception strength of first measurement signal 302 is high, and therefore as illustrated in FIG. 9A, mobile device 12 sets transmission strength of second measurement signal 304 to 50% of transmission strength of first measurement signal 302. As illustrated in FIG. 9B, second measurement signal 304 having lower reception strength than the reception strength of first measurement signal 302 is received by mobile device 12.

Figure 9C:
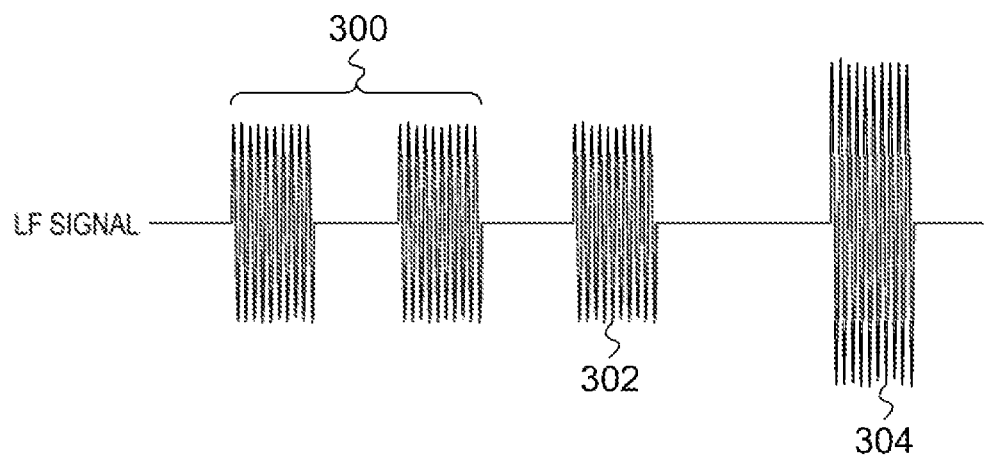
FIG. 9C is still another view illustrating a signal used by the vehicle wireless communication system in FIG. 3.
Figure 9D:
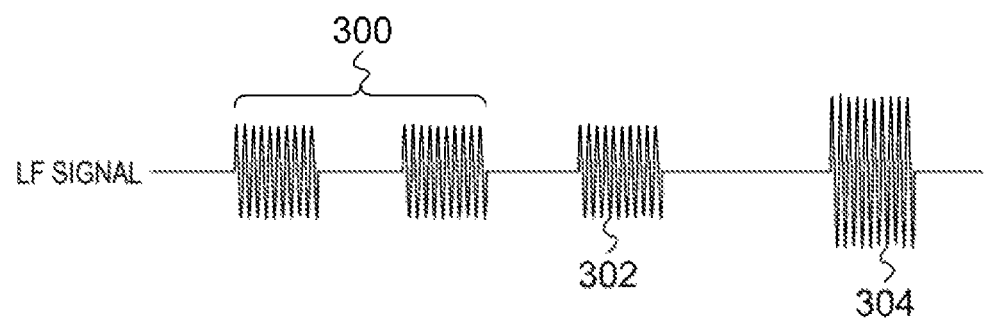
FIG. 9D is still another view illustrating a signal used by the vehicle wireless communication system in FIG. 3.

FIGS. 9C and 9D illustrate the case in which the distance between on-vehicle device 10 and mobile device 12 is long. FIG. 9C illustrates an LF signal transmitted from on-vehicle device 10. FIG. 9D illustrates an LF signal received by mobile device 12. As illustrated in FIG. 9C, on-vehicle device 10 transmits request signal 300 and first measurement signal 302. As illustrated in FIG. 9D, mobile device 12 receives request signal 300 and first measurement signal 302. The reception strength of first measurement signal 302 is low, and therefore as illustrated in FIG. 9C, mobile device 12 sets the transmission strength of second measurement signal 304 to 150% of the transmission strength of first measurement signal 302. As illustrated in FIG. 9D, second measurement signal 304 having higher reception strength than the reception strength of first measurement signal 302 is received by mobile device 12.

(2) Process in Connected State

In the connected state, LF transmitter 32 transmits the request signal and then transmits the first measurement signal to mobile device 12. Further, LF receiver 50 of mobile device 12 receives the request signal from on-vehicle device 10, and receives the first measurement signal from on-vehicle device 10. LF receiver 50 demodulates and outputs the received request signal to mobile device controller 54. When receiving the request signal from LF receiver 50, mobile device controller 54 wakes up mobile device 12. In mobile device controller 54, first determining unit 62 executes pair authentication based on the ID included in the request signal. In this regard, when the pair authentication is executed, the reception strength of the first measurement signal may be used. When the pair authentication fails, a process described below is not executed. On the other hand, when the pair authentication succeeds, the process described below is executed. In addition, mobile device controller 54 recognizes that the communication is in the connected state based on the connection information included in the request signal.

Mobile device signal generator 64 generates the first response signal. In this case, the first response signal does not include transmission strength information. Mobile device signal generator 64 outputs the first response signal to UHF transmitter 56. UHF transmitter 56 executes a modulation process on the first response signal from mobile device signal generator 64, and then transmits the first response signal from the antenna to on-vehicle device 10. UHF receiver 34 of on-vehicle device 10 receives the first response signal from mobile device 12. UHF receiver 34 demodulates and outputs the received first response signal to on-vehicle device controller 30. When receiving the first response signal from UHF receiver 34, on-vehicle device controller 30 instructs ECU 16 of vehicle 110 to unlock door lock mechanism 18.

That is, when communication of communication unit 40 is in the non-connected state, a number of times of transmission of a measurement signal is set to "plural" such as "2". When the communication of communication unit 40 is in the connected state, the number of times of transmission of the measurement signal is set to "1". In a case of the latter, the second measurement signal and the second response signal are not transmitted. Thus, in the case where the communication of communication unit 40 is in the connected state compared to the case where the communication of communication unit 40 is in the non-connected state, the number of times of transmission of the measurement signal is set small. This is because the connected state means that user 210 possessing mobile device 12 is near vehicle 110, and therefore a risk of a relay attack is low. In this case, the number of times of transmission of the measurement signal is set small to shorten a period taken by door lock mechanism 18 to perform unlocking.

On the other hand, in the non-connected state, it is highly probable that the user 210 possessing mobile device 12 is not near vehicle 110, and therefore the risk of the relay attack is high. In this case, the number of times of transmission of the measurement signal is increased to increase robustness against the relay attack. Thus, based on whether or not the communication of communication unit 40 is in the connected state or in the non-connected state, the number of times of transmission of the measurement signal transmitted subsequently to the request signal is modified.

This configuration can be achieved with a computer central processing unit (CPU), a memory, and other large scale integration (LSI) of an arbitrary computer in terms of hardware or with a program loaded on the memory in terms of software. The drawings herein illustrate functional blocks achieved through coordination of these components. Hence, it will be understood by those skilled in the art that these functional blocks can be achieved in various forms by the hardware alone or by combinations of the hardware and the software.

Figure 10:
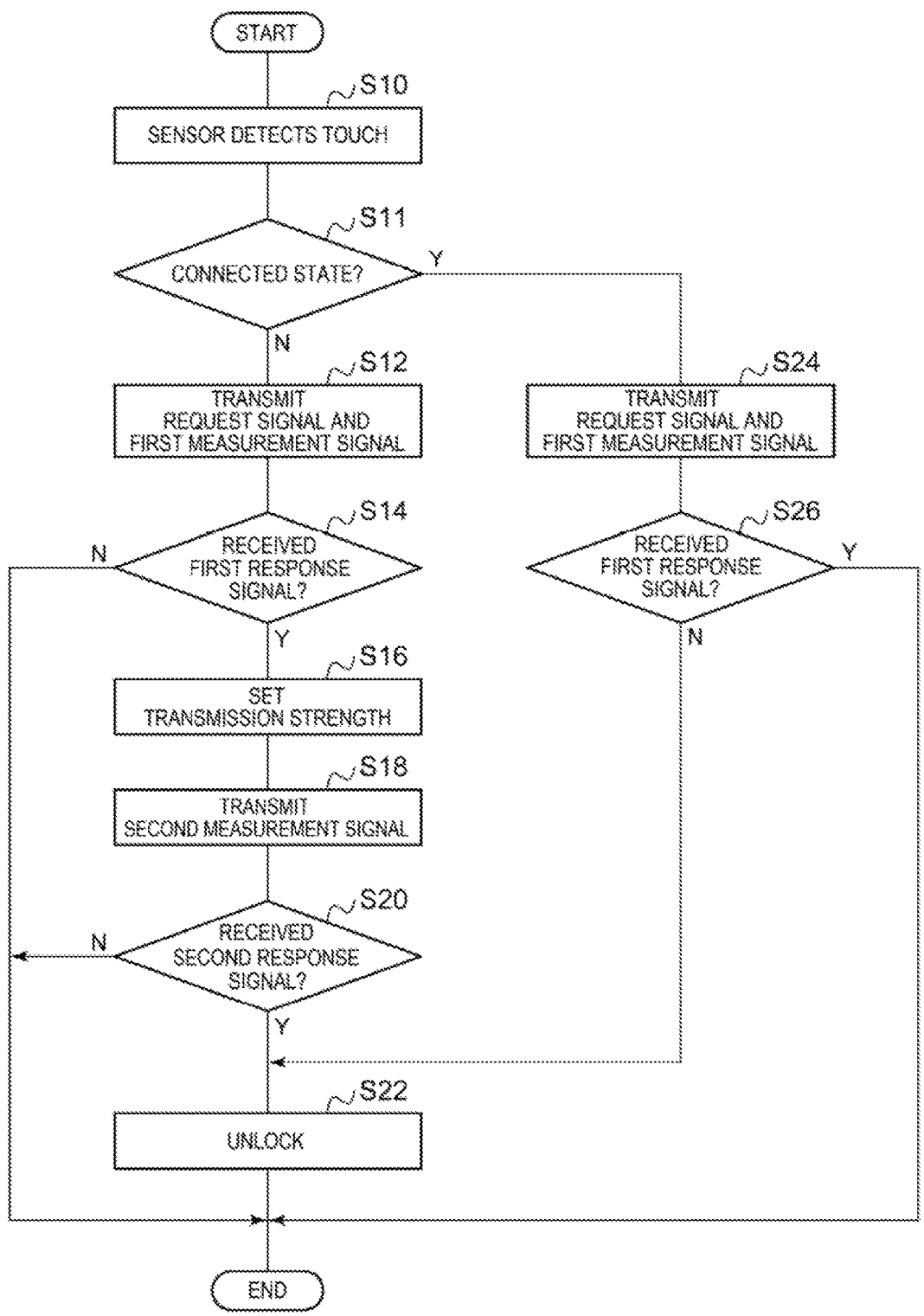
FIG. 10 is a flowchart illustrating a communication procedure of the on-vehicle device in FIG. 3.

An operation of vehicle wireless communication system 100 employing the above configuration will be described. FIG. 10 is a flowchart illustrating a communication procedure of on-vehicle device 10. Sensor 14 detects a touch (S10). When communication unit 40 is in a connected state (Y in S11), LF transmitter 32 transmits a request signal and a first measurement signal (S12). When UHF receiver 34 receives the first response signal (Y in S14), on-vehicle device controller 30 sets transmission strength to LF transmitter 32 (S16), and transmits a second measurement signal (S18). When UHF receiver 34 receives a second response signal (Y in S20), ECU 16 causes door lock mechanism 18 to unlock (S22). When UHF receiver 34 does not receive the first response signal (N in S14) or when UHF receiver 34 does not receive the second response signal (N in S20), a process is finished.

When communication unit 40 is not in the connected state (N in S11), LF transmitter 32 transmits the request signal and the first measurement signal (S24). When UHF receiver 34 receives the first response signal (Y in S26), ECU 16 causes door lock mechanism 18 to unlock (S22). When UHF receiver 34 does not receive the first response signal (N in S26), the process is finished.

Figure 11:
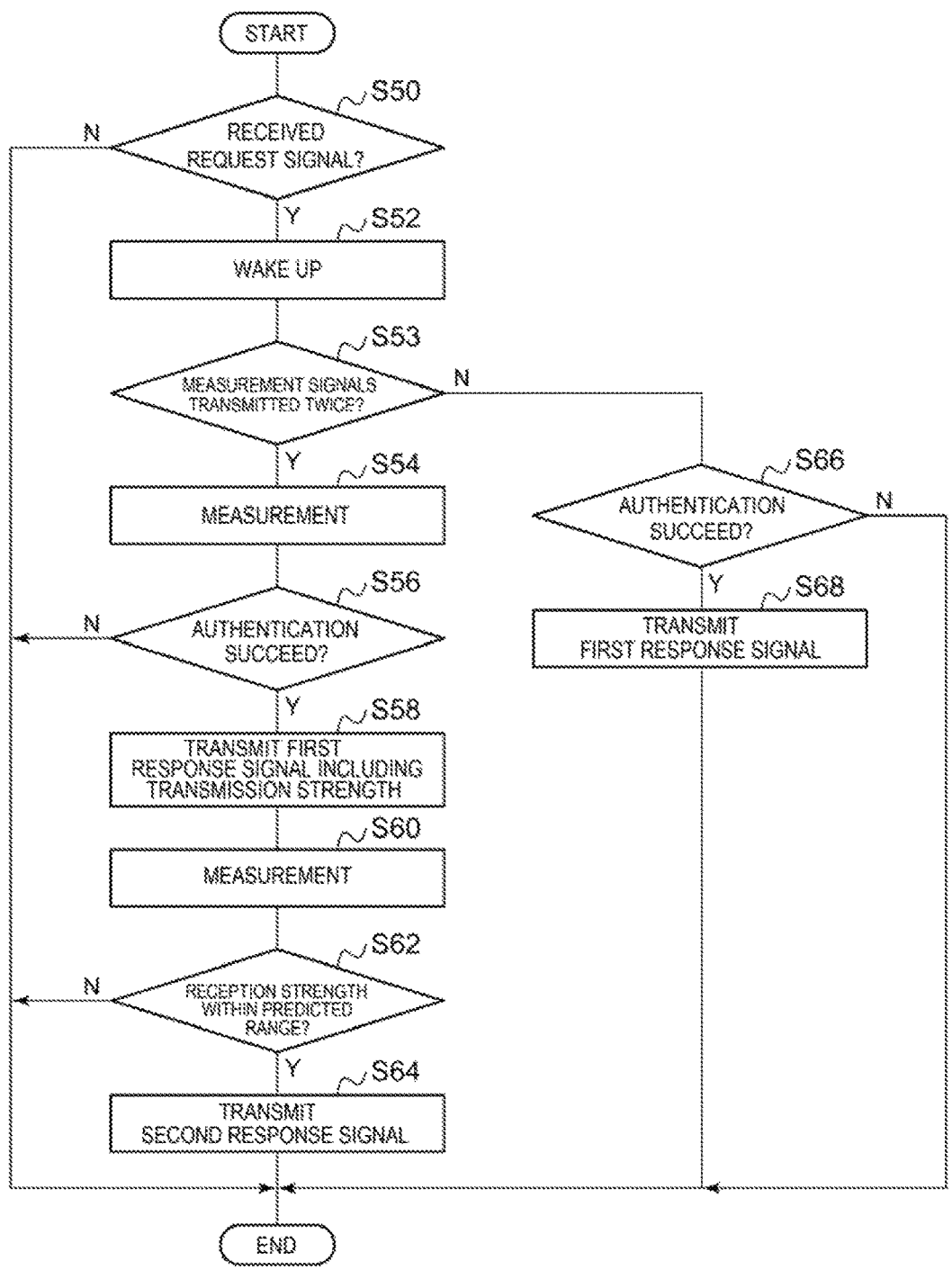
FIG. 11 is a flowchart illustrating a communication procedure of the mobile device in FIG. 3.

FIG. 11 is a flowchart illustrating a communication procedure of mobile device 12. When LF receiver 50 receives the request signal (Y in S50), mobile device controller 54 wakes up (S52). When connection information indicates that measurement signals are transmitted twice (Y in S53), measurement unit 52 measures reception strength of the first measurement signal (S54). When authentication succeeds in first determining unit 62 (Y in S56), UHF transmitter 56 transmits the first response signal including the transmission strength (S58). Measurement unit 52 measures reception strength of the second measurement signal (S60). When the reception strength is within a predicted range (Y in S62), UHF transmitter 56 transmits the second response signal (S64). In one of a case where LF receiver 50 does not receive the request signal (N in S50), a case where authentication does not succeed (N in S56), and a case where the reception strength is not within the predicted range (N in S62), the process is finished.

When the connection information does not indicate that the measurement signals are transmitted twice (N in S53) and when authentication succeeds in first determining unit 62 (Y in S66), UHF transmitter 56 transmits the first response signal including the transmission strength (S68). When authentication does not succeed (N in S66), the process is finished.

According to the exemplary embodiment of the present disclosure, the number of times of transmission of the measurement signal transmitted subsequently to the request signal is modified based on whether or not communication is in a connected state. Consequently, when the user possesses the wireless terminal device, and the user is present near the vehicle, it is possible to reduce the risk of the relay attack. Further, the number of times of transmission of the measurement signal transmitted subsequently to the request signal is modified based on whether or not the communication is in the connected state. Consequently, when the user does not possess the wireless terminal device, it is possible to reduce the risk of the relay attack by increasing the number of times of transmission. Further, when the communication is in the connected state, the number of times of transmission of the measurement signal is decreased. Consequently, it is possible to reduce process delay while reducing the risk of the relay attack. Further, when the communication is in the connected state, the number of times of transmission of the measurement signal is set to "1", so that it is possible to make a process easy.

Further, the second measurement signal is transmitted based on measured strength instructed by mobile device 12, and the second response signal transmitted based on a result of determining the second measurement signal is received. Consequently, it is possible to cause mobile device 12 to make determination based on the reception strength of the second measurement signal. Further, mobile device 12 makes determination based on the reception strength of the second measurement signal, so that it is possible to make reproduction difficult. Furthermore, reproduction becomes difficult, so that it is possible to reduce the risk of the relay attack.

Still further, when the reception strength of the second measurement signal matches information related to the transmission strength included in the first response signal, the second response signal is transmitted. Consequently, it is possible to make determination based on the reception strength. Moreover, the determination is made based on the reception strength, so that it is possible to reduce the risk of the relay attack. Moreover, information related to the transmission strength is determined based on the reception strength of the first measurement signal, so that it is possible to set the transmission strength suitable for reception. Moreover, when the reception strength is high, the transmission strength is decreased, so that it is possible to suppress saturation. Moreover, when the reception strength is low, the transmission strength is increased, so that it is possible to prevent the reception strength from going below a lower limit of reception. Moreover, the transmission strength information is randomized information, so that it is possible to improve safety.

Second Exemplary Embodiment

Next, a second exemplary embodiment will be described. Similar to the first exemplary embodiment, the second exemplary embodiment relates to a vehicle wireless communication system that includes an on-vehicle device, a mobile device, and a wireless terminal device, and executes communication for unlocking doors of a vehicle. The on-vehicle device according to the second exemplary embodiment also determines whether communication is in a connected state or in a non-connected state, and executes a process based on the determination. In this regard, a process in a case of the non-connected state is different from a process according to the first exemplary embodiment. The on-vehicle device transmits two measurement signals (a signal disposed earlier will be referred to as a "first measurement signal" and a signal disposed later will be referred to as a "second measurement signal" hereinafter) subsequently to a request signal. In this regard, transmission strength of the second measurement signal is set differently from transmission strength of the first measurement signal. When receiving the request signal, the mobile device wakes up, and measures reception strength of the first measurement signal. Further, the mobile device measures signal strength of the second measurement signal. The mobile device transmits information on the measured reception strength of the first measurement signal and information on the measured reception strength of the second measurement signal by including them in a response signal to the on-vehicle device.

When receiving the response signal, the on-vehicle device extracts the information on the reception strength of the first measurement signal and the information on the reception strength of the second measurement signal included in the response signal. The on-vehicle device specifies a relationship such as ½ times or two times between the reception strength of the first measurement signal and the reception strength of the second measurement signal. Further, the on-vehicle device also specifies a relationship between the transmission strength of the first measurement signal and the transmission strength of the second measurement signal. Furthermore, the on-vehicle device compares the relationship in reception strength and the relationship in transmission strength. When both of the relationships match each other as a result of the comparison, the on-vehicle device unlocks the doors of the vehicle. The information on the transmission strength of the first measurement signal and the information on the transmission strength of the second measurement signal are not transmitted from the on-vehicle device to the mobile device, and are used only in an internal processing of the on-vehicle device. Therefore, it is less concerned that values of the pieces of information are found out. Further, determination is made based on the measured reception strength, so that reproduction is made difficult and a relay attack is hardly made. In addition, although not described in detail in the present exemplary embodiment, the on-vehicle device may unlock the doors and then automatically open the unlocked doors.

Vehicle wireless communication system 100 according to the second exemplary embodiment is the same type as the vehicle wireless communication system in FIG. 3. Differences are that mobile device controller 54 does not include second determining unit 66, and on-vehicle device controller 30 includes an on-vehicle device determining unit (not illustrated). (2) A process in the connected state is the same as a process described above, and therefore differences in (1) a process in the non-connected state from FIG. 3 will be mainly described hereinafter. LF transmitter 32 transmits the request signal and then transmits the first measurement signal and the second measurement signal to mobile device 12. The first measurement signal and the second measurement signal are signals for causing mobile device 12 to measure reception strength, and are LF signals. Particularly, the second measurement signal is set by on-vehicle device controller 30 to have the transmission strength different from the transmission strength of the first measurement signal. In this regard, the different transmission strength may be high transmission strength or low transmission strength. Further, the relationship between the transmission strength of the first measurement signal and the transmission strength of the second measurement signal may be modified per transmission.

Figure 12:
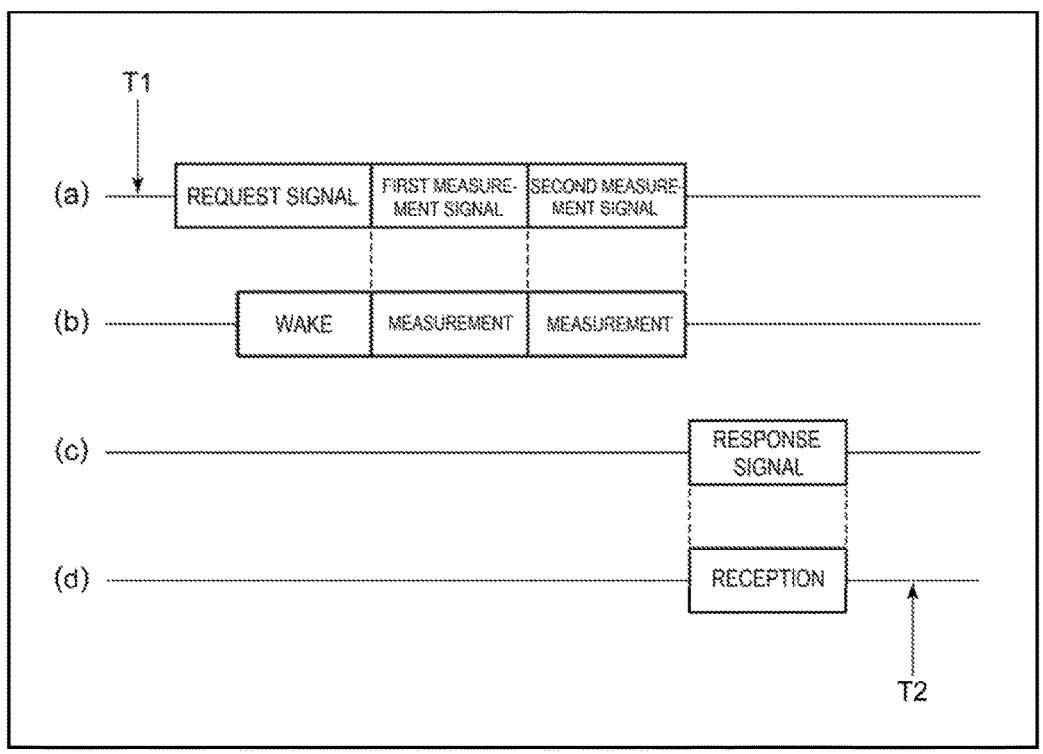
FIG. 12 is a view illustrating signals used by a vehicle wireless communication system according to a second exemplary embodiment of the present disclosure.

FIG. 12 is a view illustrating signals used by vehicle wireless communication system 100 according to the second exemplary embodiment of the present disclosure. Particularly, part (a) of FIG. 12 illustrates an LF signal transmitted from LF transmitter 32 of on-vehicle device 10. When receiving notification from sensor 14 at timing "TI", on-vehicle device 10 successively transmits the request signal, the first measurement signal, and the second measurement signal. Other points will be described below.

Figure 13:
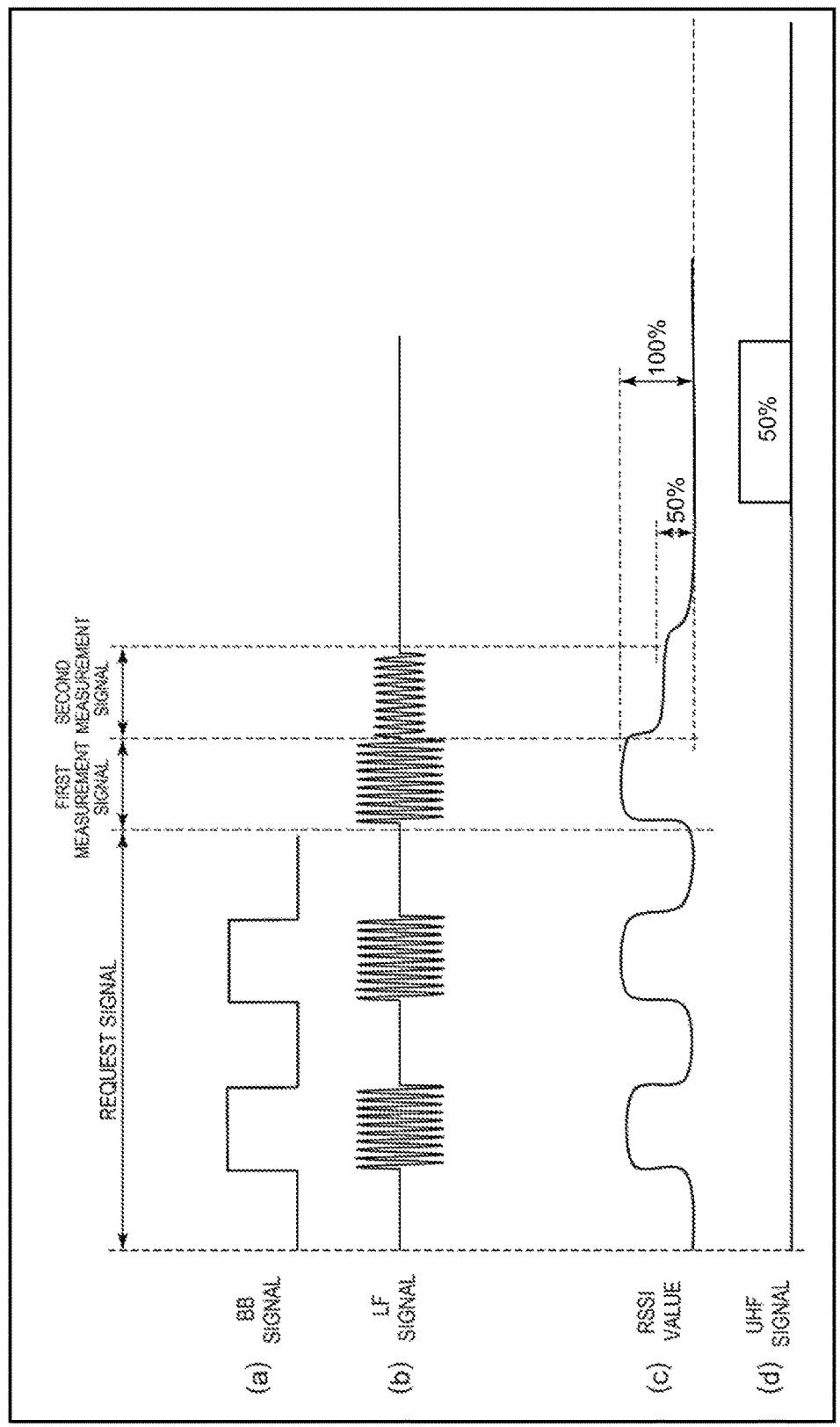
FIG. 13 is another view illustrating signals used by the vehicle wireless communication system according to the second exemplary embodiment of the present disclosure.

FIG. 13 is another view illustrating signals used by vehicle wireless communication system 100 according to the second exemplary embodiment of the present disclosure. Part (a) of FIG. 13 illustrates a request signal generated by on-vehicle device signal generator 36. The request signal is a baseband signal as illustrated in part (a) of FIG. 13. Part (b) of FIG. 13 illustrates the LF signal transmitted from LF transmitter 32. As illustrated in part (b) of FIG. 13, the first measurement signal and the second measurement signal are transmitted subsequently to the request signal modulated to the LF signal. In this regard, transmission strength of the second measurement signal is set to 50% of transmission strength of the first measurement signal. The other points will be described below, and the description returns to FIG. 3.

LF receiver 50 of mobile device 12 receives the request signal from on-vehicle device 10, and receives the first measurement signal and the second measurement signal from on-vehicle device 10. Subsequently, LF receiver 50 outputs the received first measurement signal and second measurement signal to measurement unit 52. Measurement unit 52 measures reception strength of the first measurement signal. Further, measurement unit 52 also measures reception strength of the second measurement signal. Measurement unit 52 outputs the measured reception strength to mobile device controller 54.

Part (b) of FIG. 12 illustrates a processing of the LF signal received by LF receiver 50 of mobile device 12. A wake-up operation is executed upon receiving the request signal, the first measurement signal is measured, and the second measurement signal is also measured. Part (c) of FIG. 13 illustrates a measurement result of measurement unit 52 of mobile device 12. As illustrated in part (c) of FIG. 13, part of the request signal and the first measurement signal have higher reception strength. Further, the reception strength that is 50% of the reception strength of the first measurement signal is measured for the second measurement signal. The description returns to FIG. 3.

In mobile device controller 54, first determining unit 62 extracts an ID included in the request signal. Further, first determining unit 62 obtains the ID stored in ID storage unit 60. Furthermore, first determining unit 62 executes pair authentication based on the extracted ID and the obtained ID. Any publicly known technique only needs to be used for the pair authentication, and therefore, description thereof will be omitted herein. When the pair authentication fails, a process described below is not executed. On the other hand, when the pair authentication succeeds, the process described below is executed.

Mobile device signal generator 64 receives the reception strength of the first measurement signal and the reception strength of the second measurement signal from measurement unit 52. Mobile device signal generator 64 generates a response signal including information related to the reception strength of the first measurement signal and information related to the reception strength of the second measurement signal. In this regard, the information related to the reception strength of the first measurement signal and the information related to the reception strength of the second measurement signal may be a measurement value of the reception strength of the first measurement signal and a measurement value of the reception strength of the second measurement signal, respectively. Further, these pieces of information may be a ratio of the measurement value of the reception strength of the second measurement signal with respect to the measurement value of the reception strength of the first measurement signal. In this case, the ratio is indicated as "50%", for example. Further, the information included in the response signal may be encrypted. The response signal generated by mobile device signal generator 64 is a baseband signal. Mobile device signal generator 64 outputs the response signal to UHF transmitter 56.

UHF transmitter 56 receives the response signal from mobile device signal generator 64. UHF transmitter 56 executes a modulation process on the response signal to generate a response signal (that will be also referred to as the "response signal" hereinafter) of the UHF signal. UHF transmitter 56 transmits the response signal from an antenna to on-vehicle device 10. Part (c) of FIG. 12 illustrates the UHF signal transmitted from UHF transmitter 56 of mobile device 12. The second measurement signal is received by mobile device 12, and then the response signal is transmitted.

Part (d) of FIG. 13 illustrates the response signal transmitted from UHF transmitter 56 of mobile device 12. For example, the ratio of the measurement value of the reception strength of the second measurement signal with respect to the measurement value of the reception strength of the first measurement signal is "50%". The description returns to FIG. 3. In addition, a transmission rate of a UHF signal is, for example, 7.8 kbps, and a transmission rate of an LF signal is, for example, 4 kbps. Hence, a transmission rate in UHF transmitter 56 and UHF receiver 34 are higher than a transmission rate in LF receiver 50 and LF transmitter 32.

UHF receiver 34 of on-vehicle device 10 receives the response signal from mobile device 12. UHF receiver 34 demodulates the received response signal to generate a response signal (that will be also referred to as the "response signal" hereinafter) of the baseband signal. UHF receiver 34 outputs the response signal to on-vehicle device controller 30. Part (d) of FIG. 12 illustrates a processing of the UHF signal received by UHF receiver 34 of on-vehicle device 10. As illustrated in part (d) of FIG. 12, the response signal is received. The description returns to FIG. 3.

The on-vehicle device determining unit of on-vehicle device controller 30 receives the response signal from UHF receiver 34. The on-vehicle device determining unit extracts, from the response signal, the information related to the reception strength of the first measurement signal and the information related to the reception strength of the second measurement signal. The on-vehicle device determining unit derives a relationship (referred to as a "reception strength relationship" hereinafter) between the information related to the reception strength of the first measurement signal and the information related to the reception strength of the second measurement signal. The reception strength relationship is indicated as the ratio of the reception strength of the second measurement signal with respect to the reception strength of the first measurement signal. Hence, when the information related to the reception strength of the first measurement signal and the information related to the reception strength of the second measurement signal are indicated as the ratio of the measurement value of the reception strength of the second measurement signal with respect to the measurement value of the reception strength of the first measurement signal, deriving the reception strength relationship is omitted.

On the other hand, the on-vehicle device determining unit receives the transmission strength of the first measurement signal and the transmission strength of the second measurement signal from on-vehicle device controller 30. The on-vehicle device determining unit derives the ratio of the transmission strength of the second measurement signal with respect to the transmission strength of the first measurement signal to derive a relationship (referred to as a "transmission strength relationship" hereinafter) between the transmission strength of the first measurement signal and the transmission strength of the second measurement signal. Further, the on-vehicle device determining unit compares the reception strength relationship and the transmission strength relationship. More specifically, when a difference between the reception strength relationship and the transmission strength relationship is smaller than a threshold, the on-vehicle device determining unit determines that the reception strength relationship and the transmission strength relationship match. When the difference is the threshold or more, the on-vehicle device determining unit determines that the reception strength relationship and the transmission strength relationship do not match. A case where the reception strength relationship and the transmission strength relationship do not match corresponds to a case that a relay attack is made. A case where the reception strength relationship and the transmission strength relationship match corresponds to a case that a relay attack is not made. That is, this determination determines whether or not there is the relay attack on mobile device 12. When determining that the reception strength relationship and the transmission strength relationship match, the on-vehicle device determining unit instructs ECU 16 of vehicle 110 to unlock door lock mechanism 18.

So far, on-vehicle device 10 sequentially transmits the first measurement signal and the second measurement signal, and mobile device 12 transmits the response signal. Further, the response signal includes the information related to the reception strength of the first measurement signal and the information related to the reception strength of the second measurement signal. On the other hand, the first measurement signal and the second measurement signal may be transmitted at some temporal interval, and a first response signal and a second response signal may be transmitted so as to match the first measurement signal and the second measurement signal, respectively. A process in this case will be described below.

Figure 14:
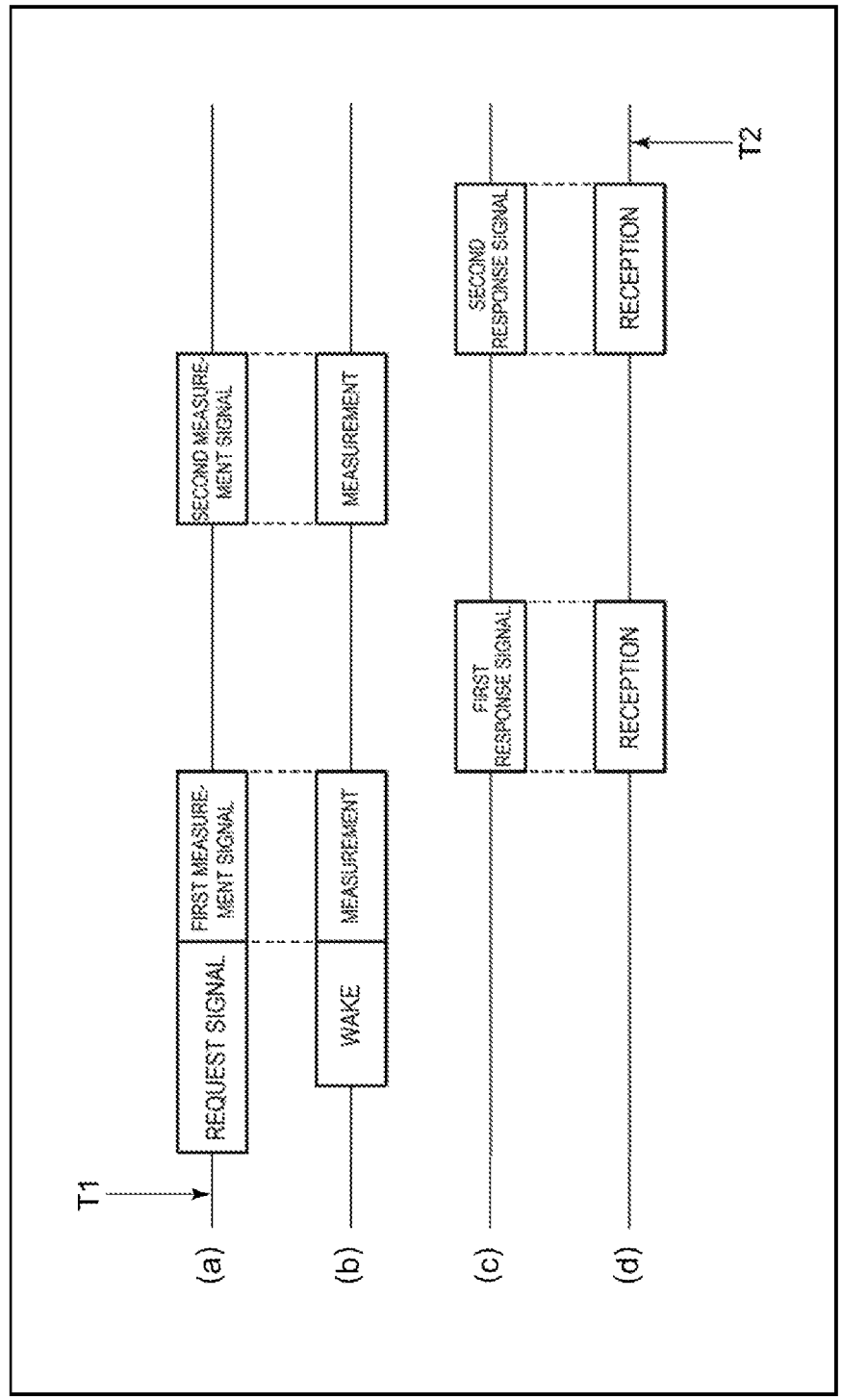
FIG. 14 is still another view illustrating signals used by the vehicle wireless communication system according to the second exemplary embodiment of the present disclosure.

FIG. 14 is still another view illustrating signals used by vehicle wireless communication system 100 according to the second exemplary embodiment of the present disclosure. FIG. 14 is illustrated similarly to FIG. 12. As illustrated in part (a) of FIG. 14, on-vehicle device 10 sequentially transmits the request signal and the first measurement signal. As illustrated in part (b) of FIG. 14, mobile device 12 wakes up by receiving the request signal, and measures the reception strength of the first measurement signal. As illustrated in part (c) of FIG. 14, mobile device 12 transmits the first response signal including the information related to the reception strength of the first measurement signal. As illustrated in part (d) of FIG. 14, on-vehicle device 10 receives the first response signal.

Subsequently, as illustrated in part (a) of FIG. 14, on-vehicle device 10 transmits the second measurement signal. As illustrated in part (b) of FIG. 14, mobile device 12 measures the reception strength of the second measurement signal. As illustrated in part (c) of FIG. 14, mobile device 12 transmits the second response signal including the information related to the reception strength of the second measurement signal. As illustrated in part (d) of FIG. 14, on-vehicle device 10 receives the second response signal.

This configuration can be achieved with a CPU, a memory, and other LSI in terms of hardware or with a program or an application loaded on the memory in terms of software. The drawing herein illustrates functional blocks achieved through coordination of these components. Hence, it will be understood by those skilled in the art that these functional blocks can be achieved in various forms by the hardware alone or by combinations of the hardware and the software.

Figure 15:
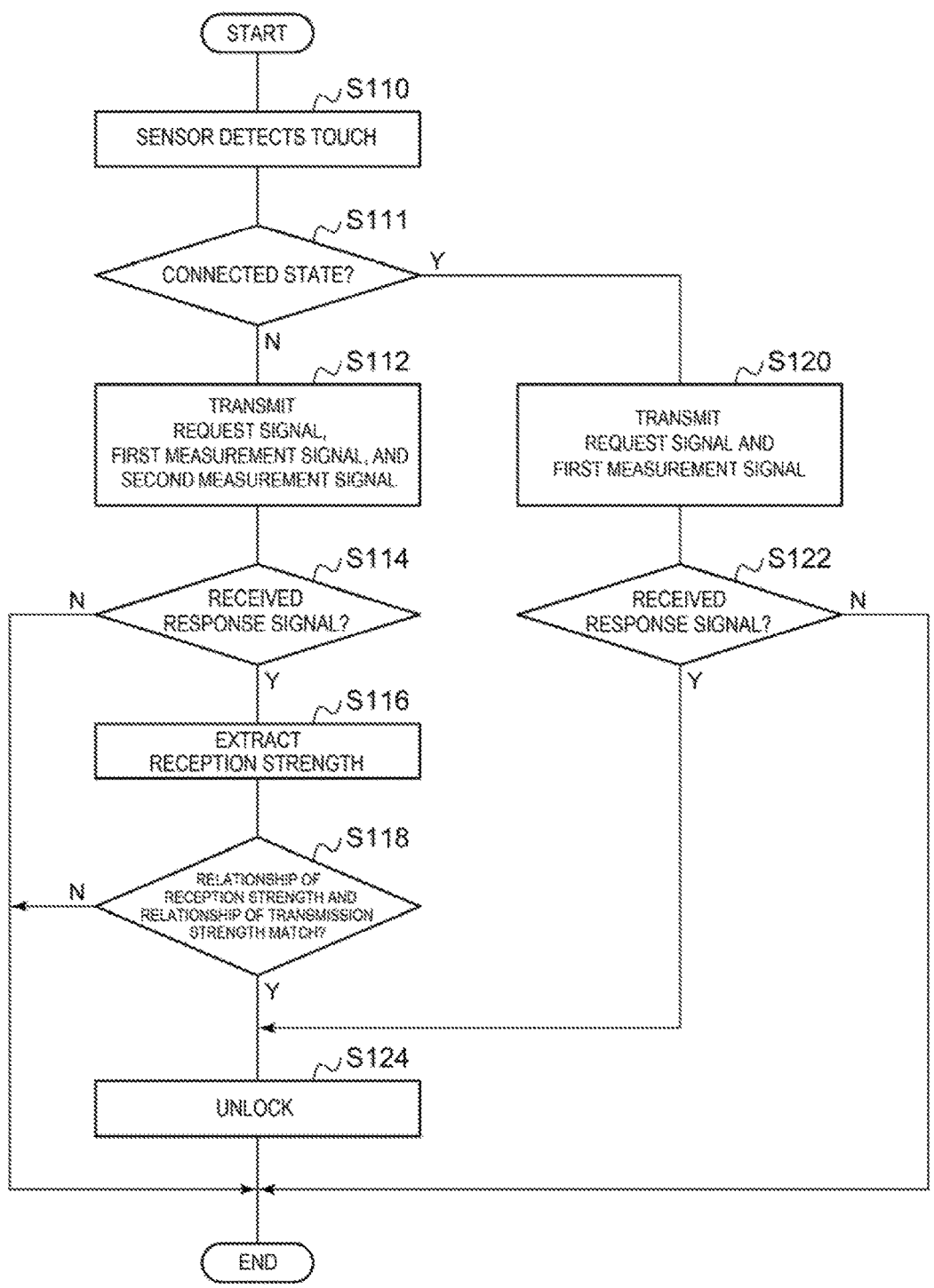
FIG. 15 is a flowchart illustrating a communication procedure of the on-vehicle device according to the second exemplary embodiment of the present disclosure.

An operation of vehicle wireless communication system 100 employing the above configuration will be described. FIG. 15 is a flowchart illustrating a communication procedure of on-vehicle device 10 according to the second exemplary embodiment of the present disclosure. Sensor 14 detects a touch (S110). When communication unit 40 is not in a connected state (N in S111), LF transmitter 32 transmits a request signal, a first measurement signal, and a second measurement signal (S112). When UHF receiver 34 receives the response signals (Y in S114), on-vehicle device determining unit extracts their reception strength (S116). When a reception strength relationship and a transmission strength relationship match (Y in S118), ECU 16 causes door lock mechanism 18 to unlock (S124). When UHF receiver 34 does not receive the response signals (N in S114), or when the reception strength relationship and the transmission strength relationship do not match (N in S118), a process is finished.

When communication unit 40 is in the connected state (Y in S111), LF transmitter 32 transmits the request signal and the first measurement signal (S120). When UHF receiver 34 receives the response signal (Y in S122), ECU 16 causes door lock mechanism 18 to unlock (S124). When UHF receiver 34 does not receive the response signal (N in S122), the process is finished.

Figure 16:
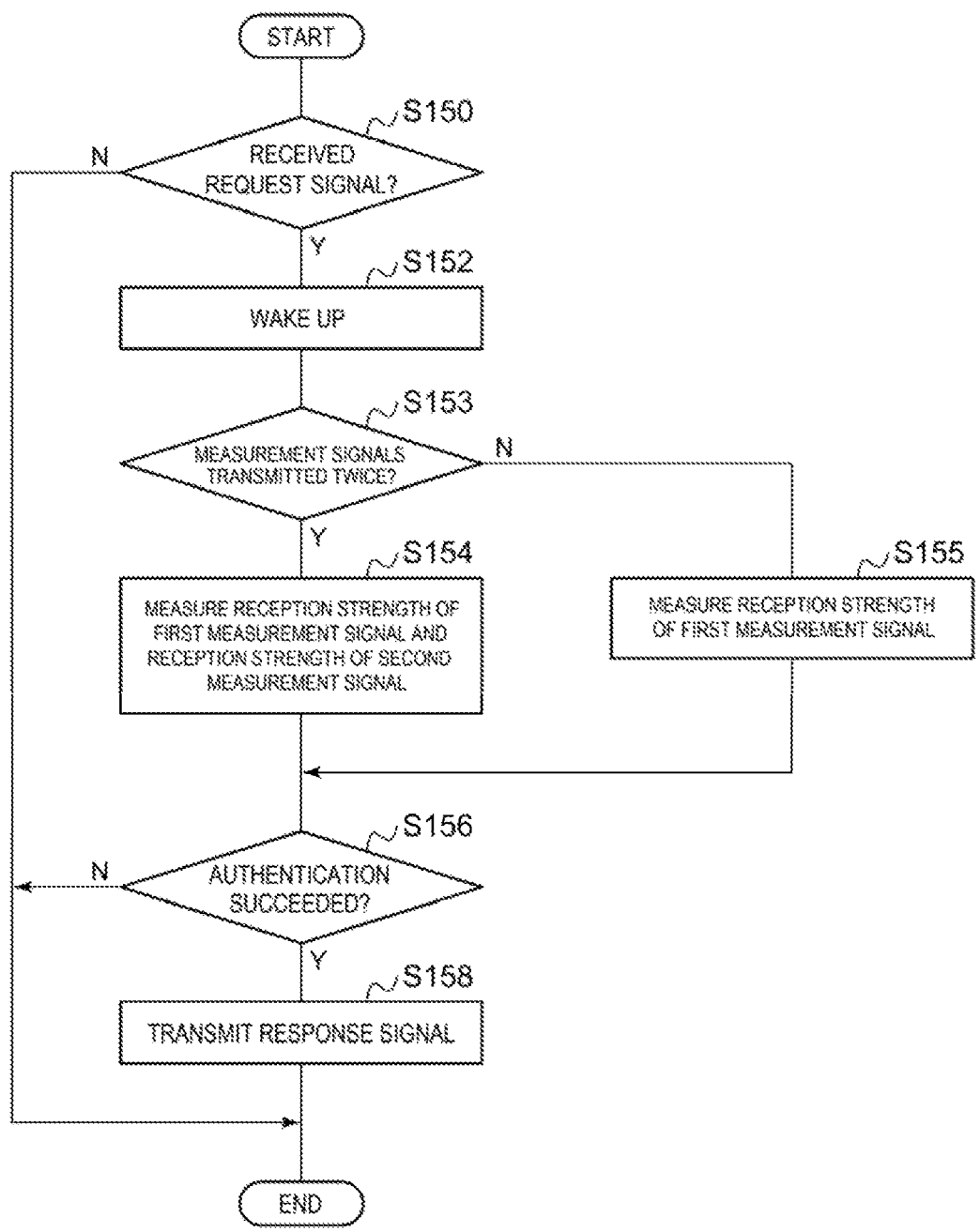
FIG. 16 is a flowchart illustrating the communication procedure of the mobile device according to the second exemplary embodiment of the present disclosure.

FIG. 16 is a flowchart illustrating the communication procedure of mobile device 12 according to the second exemplary embodiment of the present disclosure. When LF receiver 50 receives the request signal (Y in S150), mobile device controller 54 wakes up (S152). When connection information indicates that measurement signals are transmitted twice (Y in S153), measurement unit 52 measures the reception strength of the first measurement signal and the reception strength of the second measurement signal (S154). When the connection information does not indicate that the measurement signals are transmitted twice (N in S153), measurement unit 52 measures the reception strength of the first measurement signal (S155). When authentication succeeds in first determining unit 62 (Y in S156), UHF transmitter 56 transmits the response signal (S158). When LF receiver 50 does not receive the request signal (N in S150) or when the authentication does not succeed (N in S156), the process is finished.

According to the second exemplary embodiment of the present disclosure, a transmission strength setting is not transmitted from the on-vehicle device, and is used only in an internal processing of the on-vehicle device, so that it is possible to make reproduction difficult. Further, the reception strength is used, so that it is possible to make reproduction difficult. Furthermore, reproduction becomes difficult, so that it is possible to reduce the risk of the relay attack. Still further, a signal traveling from the mobile device to the on-vehicle device has a higher transmission rate. Consequently, it is possible to easily add information related to the reception strength to the response signal. Moreover, the measurement signals can be separately received twice, so that it is possible to improve the degree of freedom of the configuration. Moreover, the mobile device is not notified of the transmission strength setting by the on-vehicle device, so that it is possible to reduce the risk of the relay attack.

Third Exemplary Embodiment

Next, a third exemplary embodiment will be described. Similar to the above, the third exemplary embodiment relates to a vehicle wireless communication system that includes an on-vehicle device, a mobile device, and a wireless terminal device, and executes communication for unlocking doors of a vehicle. The on-vehicle device according to the third exemplary embodiment also determines whether communication is in a connected state or in a non-connected state, and executes a process based on the determination. In this regard, a process in a case of the non-connected state is different from the above. The on-vehicle device includes a first antenna and a second antenna as antennas for transmission. For example, the first antenna is installed on a side portion of the vehicle, and the second antenna is installed on a rear portion of the vehicle. The on-vehicle device transmits the request signal from the first antenna, transmits a measurement signal (a measurement signal transmitted at this timing will be referred to as a "first measurement signal" hereinafter) from the first antenna, and next transmits a measurement signal from the second antenna in order.

When receiving the request signal, the mobile device wakes up, and sequentially measures reception strength of the first measurement signal from the first antenna and reception strength of the first measurement signal from the second antenna. The mobile device determines transmission strength of measurement signal (referred to as a "second measurement signal" hereinafter) that the on-vehicle device needs to transmit next. More specifically, the mobile device determines the transmission strength of the second measurement signal that needs to be transmitted from the first antenna, and the transmission strength of the second measurement signal that needs to be transmitted from the second antenna. The mobile device transmits a response signal (a response signal transmitted at this timing will be referred to as a "first response signal" hereinafter) including information on these determined transmission strengths.

When receiving the first response signal, the on-vehicle device extracts the information on the transmission strength included in the first response signal, and transmits the second measurement signal based on the transmission strengths matching the information on the transmission strengths from the first antenna and next transmits the second measurement signal from the second antenna in order. The mobile device sequentially measures reception strength of the second measurement signal from the first antenna and reception strength of the second measurement signal from the second antenna. The mobile device estimates a relationship in reception strength between the second measurement signals based on a relationship between the reception strength of the first measurement signal from the first antenna and the reception strength of the first measurement signal from the second antenna, and the transmission strength information included in the first response signal.

Further, when determining that the relationship between the reception strength of the second measurement signal from the first antenna and the reception strength of the second measurement signal from the second antenna match the estimated relationship, the mobile device transmits a response signal (a response signal transmitted at this timing will be referred to as a "second response signal" hereinafter). When receiving the second response signal, the on-vehicle device unlocks the doors of the vehicle. The transmission strength of the second measurement signal transmitted from the on-vehicle device is instructed every time by the mobile device. Therefore, it is less concerned that a value of the transmission strength is found out. Further, the determination is executed based on a difference between the relationship between the reception strengths of the first measurement signals from the two antennas and the relationship between the reception strengths of the second measurement signal from the two antennas. Consequently, reproduction is difficult, and the relay attack is hardly made.

Figure 17:
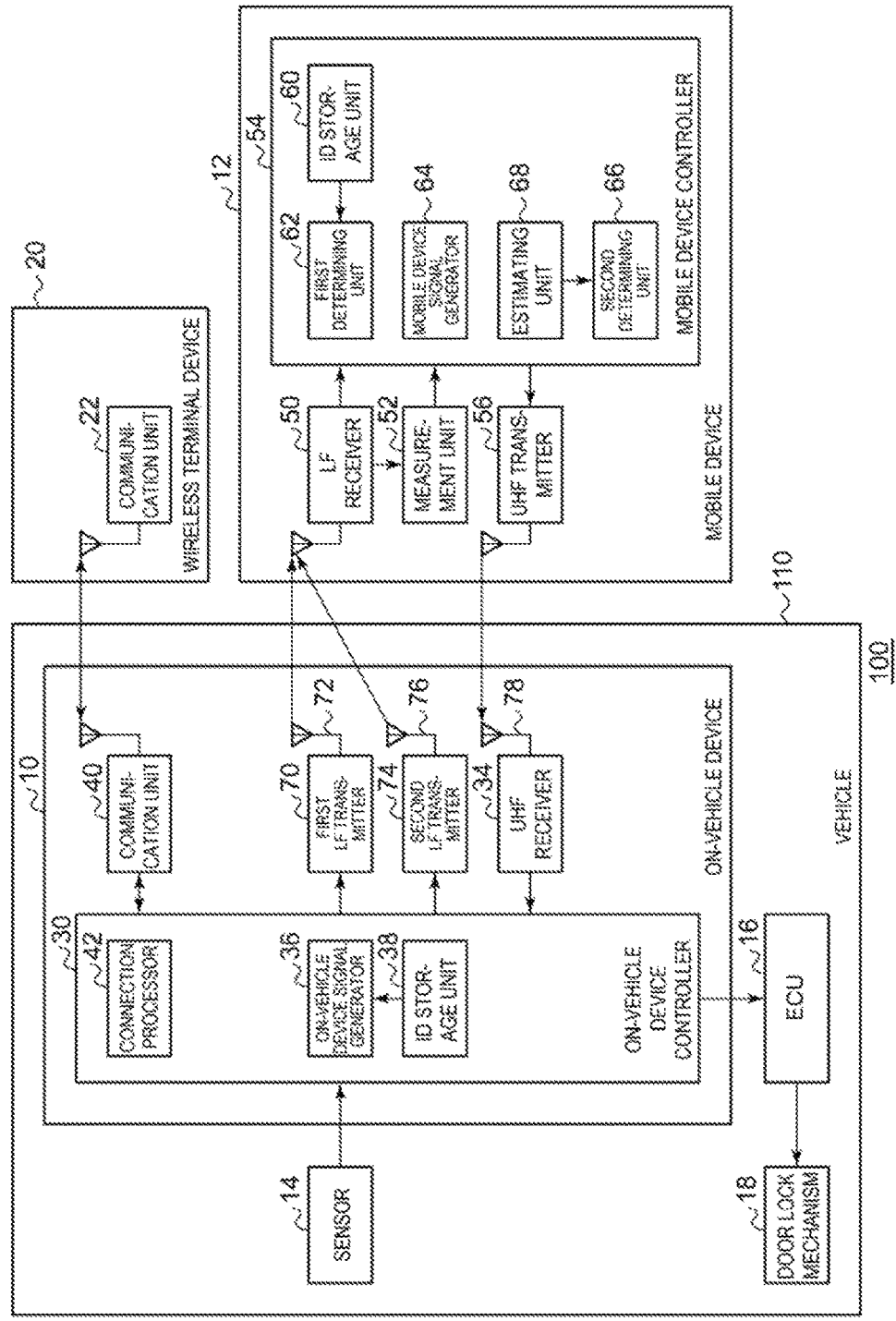
FIG. 17 is a view illustrating a configuration of a vehicle wireless communication system according to a third exemplary embodiment of the present disclosure.

FIG. 17 is a view illustrating a configuration of vehicle wireless communication system 100 according to the third exemplary embodiment of the present disclosure. Vehicle wireless communication system 100 includes vehicle 110, mobile device 12, and wireless terminal device 20. Vehicle 110 includes on-vehicle device 10, sensor 14, ECU 16, and door lock mechanism 18.

On-vehicle device 10 includes on-vehicle device controller 30, first LF transmitter 70, first antenna 72, second LF transmitter 74, second antenna 76, UHF antenna 78, and UHF receiver 34. On-vehicle device controller 30 includes on-vehicle device signal generator 36, ID storage unit 38, and connection processor 42. Mobile device 12 includes LF receiver 50, measurement unit 52, mobile device controller 54, and UHF transmitter 56. Mobile device controller 54 includes ID storage unit 60, first determining unit 62, mobile device signal generator 64, estimating unit 68, and second determining unit 66. Wireless terminal device 20 includes communication unit 22.

(2) A process in the connected state is the same as a process described above, and therefore differences of (1) a process in the non-connected state from FIG. 3 will be mainly described. First LF transmitter 70 transmits a request signal and then transmits the first measurement signal from first antenna 72 to mobile device 12. Further, second LF transmitter 74 transmits the first measurement signal from first antenna 72 and then transmits the first measurement signal from second antenna 76 to mobile device 12. In this case, for example, transmission strength of the first measurement signal transmitted from second antenna 76 is set to the same as the transmission strength of the first measurement signal transmitted from first antenna 72. Thus, the first measurement signal is transmitted at different timing from first antenna 72 and second antenna 76.

Figure 18:
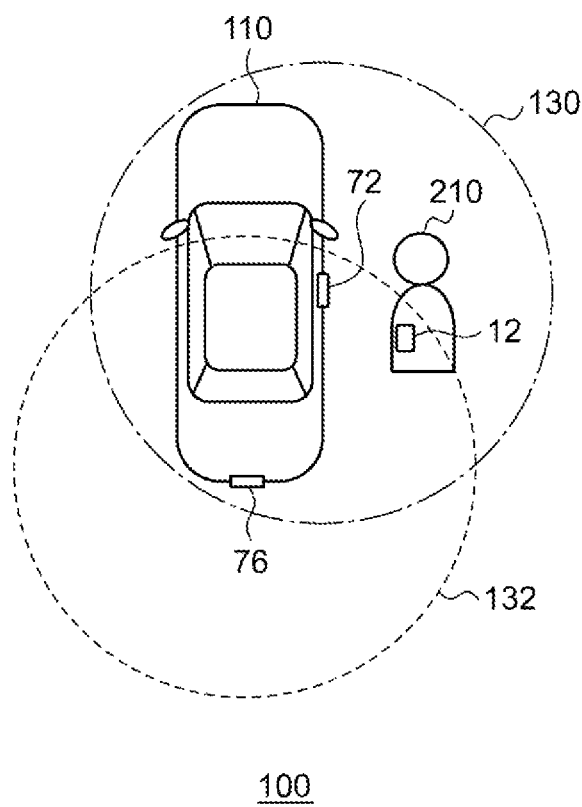
FIG. 18 is a view illustrating a disposition of a first antenna and a second antenna in FIG. 17.

FIG. 18 is a view illustrating a disposition of first antenna 72 and second antenna 76. First antenna 72 is disposed similar to left side antenna 220 or right side antenna 222 in FIG. 1A, and second antenna 76 is disposed similar to rear antenna 224 in FIG. 1A. In addition, a receivable range of an LF signal transmitted from first antenna 72 is indicated by first area 130. A receiving range of an LF signal transmitted from second antenna 76 is indicated by second area 132. When user 210 unlocks the doors of vehicle 110, a distance between mobile device 12 and first antenna 72 is different from a distance between mobile device 12 and second antenna 76. Further, a direction toward first antenna 72 and a direction toward second antenna 76 in mobile device 12 are also different from each other.

Figure 19:
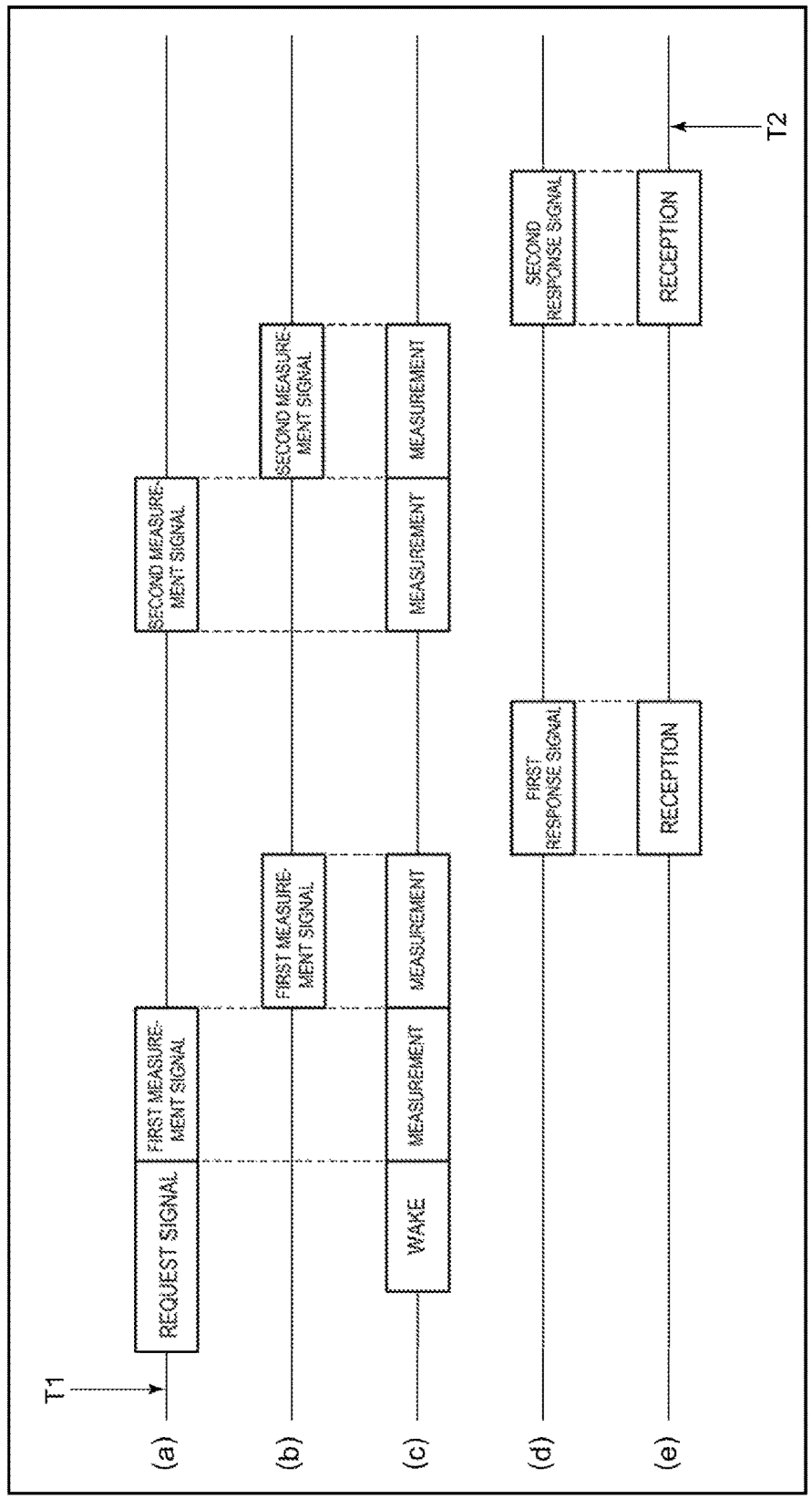
FIG. 19 is a view illustrating signals used by the vehicle wireless communication system in FIG. 17.

FIG. 19 is a view illustrating signals used by vehicle wireless communication system 100. Particularly, part (a) of FIG. 19 illustrates an LF signal transmitted from first antenna 72 of on-vehicle device 10. When receiving notification from sensor 14 at timing "TI", on-vehicle device 10 sequentially transmits the request signal and the first measurement signal from first antenna 72. Part (b) of FIG. 19 illustrates an LF signal transmitted from second antenna 76 of on-vehicle device 10. On-vehicle device 10 transmits the first measurement signal from first antenna 72, and then transmits the first measurement signal from second antenna 76. Other points will be described below.

Figure 20:
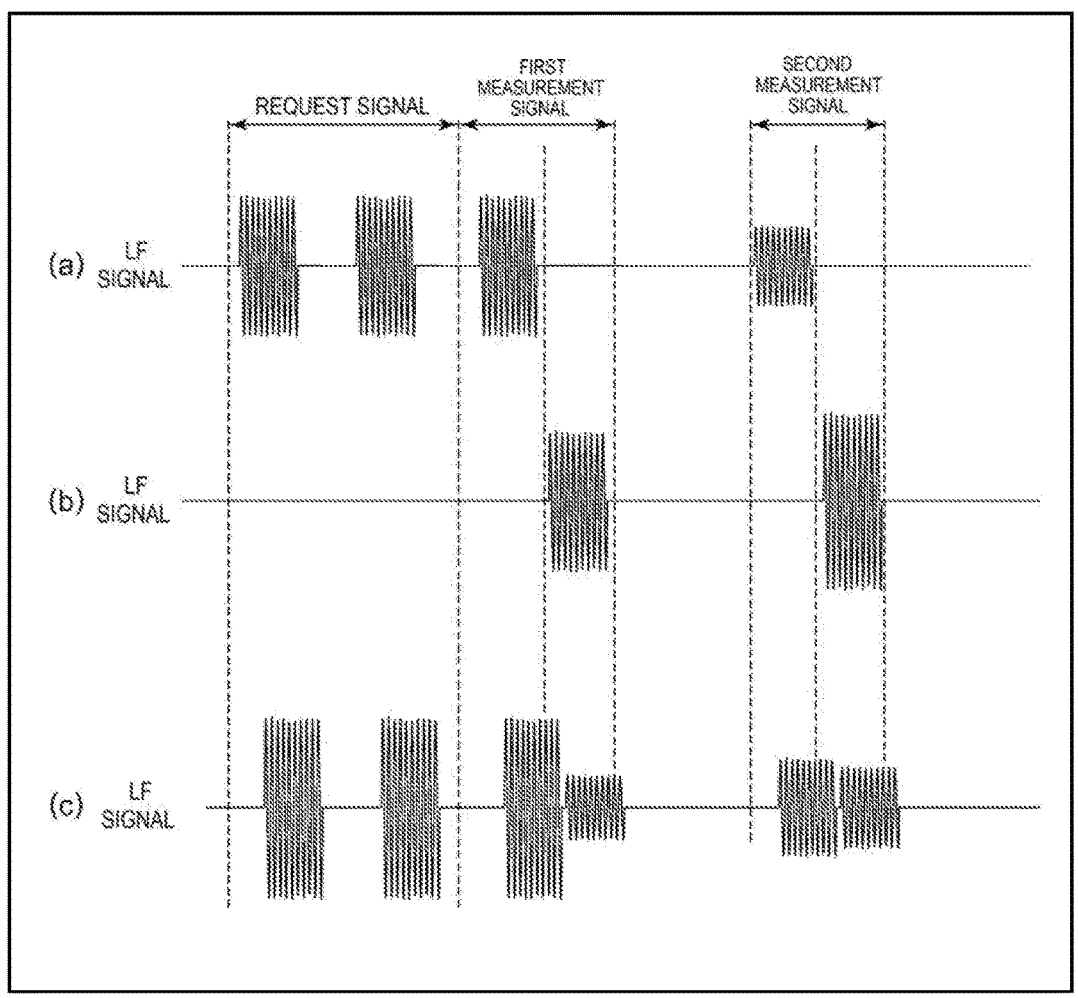
FIG. 20 is a view illustrating signals used by the vehicle wireless communication system in FIG. 17.

FIG. 20 is another view illustrating signals used by vehicle wireless communication system 100. Part (a) of FIG. 20 illustrates the LF signal transmitted from first antenna 72 of on-vehicle device 10 similar to part (a) of FIG. 19. First antenna 72 transmits the request signal, and then transmits the first measurement signal. Part (b) of FIG. 20 illustrates the LF signal transmitted from second antenna 76 of on-vehicle device 10 similar to part (b) of FIG. 19. Second antenna 76 transmits the first measurement signal based on the same transmission strength as the transmission strength of the first measurement signal transmitted from first antenna 72. The other points will be described below, and the description returns to FIG. 17.

LF receiver 50 of mobile device 12 receives the request signal from first antenna 72 of on-vehicle device 10, and receives the first measurement signals from first antenna 72 and second antenna 76 of on-vehicle device 10 at different timing. LF receiver 50 demodulates the received request signal, and generates a request signal (that will be also referred to as the "request signal" hereinafter) of a baseband signal. LF receiver 50 outputs the request signal to mobile device controller 54. When receiving the request signal from LF receiver 50, mobile device controller 54 wakes up mobile device 12.

Figure 21:
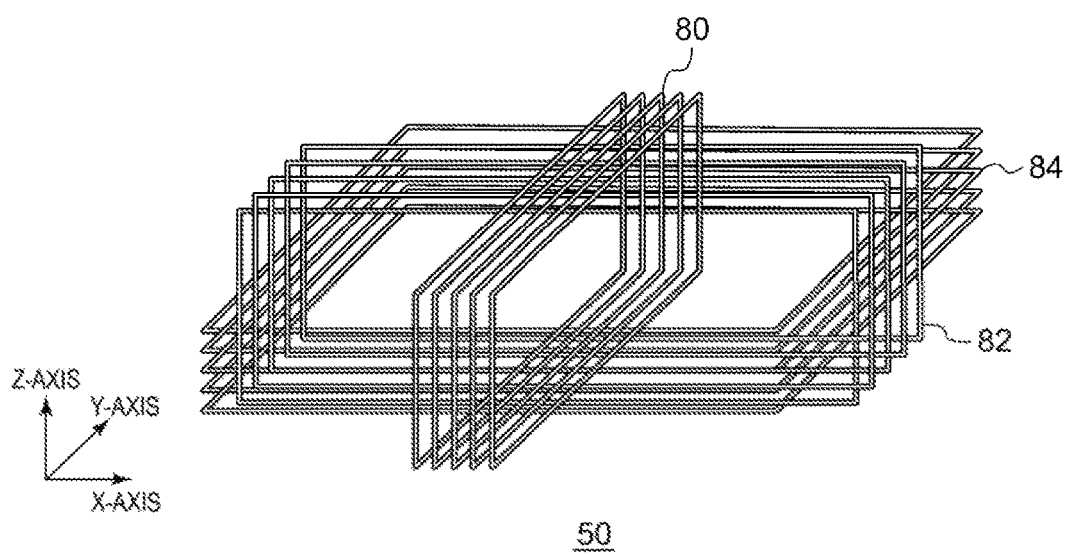
FIG. 21 is a view illustrating a configuration of an antenna connected with an LF receiver in FIG. 17.

Prior to description of a processing of the first measurement signal, the antennas connected with LF receiver 50 will be described. This antenna is configured as a multi-dimensional antenna such as a three-dimensional antenna. FIG. 21 is a view illustrating a configuration of the antenna connected with LF receiver 50. As illustrated in FIG. 21, an X axis, a Y axis, and a Z axis orthogonal to each other compose three dimensions. Further, the antenna includes X antenna 80, Y antenna 82 and Z antenna 84. X antenna 80 receives a signal including an X-axis direction component. Y antenna 82 receives a signal including a Y-axis direction component. Z antenna 84 receives a signal including a Z-axis direction component. Hence, X antenna 80 receives the X axis-direction component of the first measurement signal. Y antenna 82 receives the Y-axis direction component of the first measurement signal. Z antenna 84 receives the Z-axis direction component of the first measurement signal. The description returns to FIG. 17.

Figure 22A:
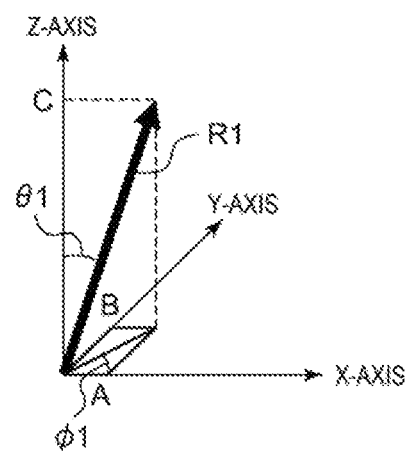
FIG. 22A is a view illustrating a measurement result of a measurement unit in FIG. 17.

LF receiver 50 outputs the received first measurement signal from first antenna 72 and the received first measurement signal from second antenna 76 to measurement unit 52 in order. Measurement unit 52 measures reception strength such as an RSSI of the first measurement signal from first antenna 72. FIGS. 22A to 22D are views illustrating measurement results of measurement unit 52. FIG. 22A illustrates reception strength "R1" of the first measurement signal from first antenna 72. In this regard, the X-axis direction component of X antenna 80 is indicated by "A". The Y-axis direction component of Y antenna 82 is indicated by "B". The Z-axis direction component of Z antenna 84 is indicated by "C". Hence, reception strength "R1" of the first measurement signal from first antenna 72 is indicated by a vector sum of "A+B+C".

Figure 22B:
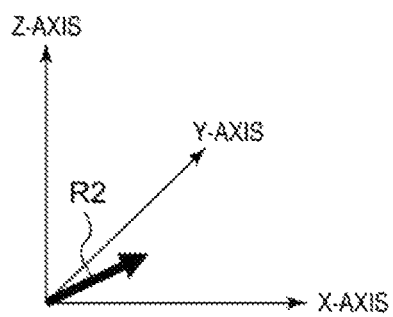
FIG. 22B is a view illustrating a measurement result of the measurement unit in FIG. 17.

Further, measurement unit 52 also measures reception strength of the first measurement signal from second antenna 76, similar to the reception strength of the first measurement signal from first antenna 72. FIG. 22B illustrates reception strength "R2" of the first measurement signal from second antenna 76. FIG. 22B is illustrated similarly to FIG. 22A. The description returns to FIG. 17. Measurement unit 52 outputs the measured reception strength of the first measurement signal from first antenna 72 and the measured reception strength of the first measurement signal from second antenna 76 to mobile device controller 54. Mobile device controller 54 stores the reception strength of the first measurement signal from first antenna 72 and the reception strength of the first measurement signal from second antenna 76.

Part (c) of FIG. 19 illustrates a processing of the LF signal received by LF receiver 50 of mobile device 12. A wake-up operation is executed upon receiving the request signal, the first measurement signal from first antenna 72 is measured, and the first measurement signal from second antenna 76 is also measured. Part (c) of FIG. 20 illustrates the LF signal received by LF receiver 50 of mobile device 12. As described above, the first measurement signal from first antenna 72 and the first measurement signal from second antenna 76 are transmitted by the same transmission strength. On the other hand, as illustrated in FIG. 18, a distance from first antenna 72 to mobile device 12 is shorter than a distance from second antenna 76 to mobile device 12. The reception strength of the first measurement signal from first antenna 72 is higher than the reception strength of the first measurement signal from second antenna 76. The description returns to FIG. 17.

In mobile device controller 54, first determining unit 62 extracts an ID included in the request signal. Further, first determining unit 62 obtains the ID stored in ID storage unit 60. Furthermore, first determining unit 62 executes pair authentication based on the extracted ID and the obtained ID. Any publicly known technique only needs to be used for the pair authentication, and therefore, description thereof will be omitted herein. When the pair authentication fails, a process described below is not executed. On the other hand, when the pair authentication succeeds, the process described below is executed.

Mobile device signal generator 64 generates a first response signal including information (referred to as "transmission strength information" hereinafter) related to the transmission strengths for transmitting the second measurement signals from first antenna 72 and second antenna 76. More specifically, mobile device signal generator 64 determines the transmission strength for transmitting the second measurement signal from first antenna 72 and the transmission strength for transmitting the second measurement signal from second antenna 76 so as to change a ratio of the transmission strength of first antenna 72 and the transmission strength of second antenna 76 between the first measurement signals and the second measurement signals.

As described above, the transmission strength for transmitting the first measurement signal from first antenna 72 and the transmission strength for transmitting the first measurement signal from second antenna 76 are the same. Therefore, the ratio of the transmission strengths is "1". More specifically, mobile device signal generator 64 determines the transmission strength for transmitting the second measurement signal from first antenna 72 and the transmission strength for transmitting the second measurement signal from second antenna 76 such that the ratio of the second measurement signals is other than "1".

For example, mobile device signal generator 64 determines the transmission strength for transmitting the second measurement signal from first antenna 72 as "50%" of the transmission strength for transmitting the first measurement signal from first antenna 72. Further, mobile device signal generator 64 determines the transmission strength for transmitting the second measurement signal from second antenna 76 as "120%" of the transmission strength for transmitting the first measurement signal from second antenna 76. In this case, transmission strength information indicates "50%, 120%".

In addition, the transmission strength information does not need to indicate a relative value with respect to the transmission strength of the first measurement signal, and may indicate an absolute value. Further, when the transmission strength of the first measurement signal transmitted from first antenna 72 and the transmission strength of the second measurement signal transmitted from first antenna 72 are fixed values, the transmission strength information may indicate the transmission strength for transmitting the second measurement signal from second antenna 76 as the ratio with respect to the fixed values. In addition, when being included in the first response signal, the transmission strength information may be encrypted. Herein, the first response signal generated by mobile device signal generator 64 is a baseband signal. Mobile device signal generator 64 outputs the first response signal to UHF transmitter 56.

UHF transmitter 56 receives the first response signal from mobile device signal generator 64. UHF transmitter 56 executes a modulation process on the first response signal to generate a first response signal (that will be also referred to as the "first response signal" hereinafter) of a UHF signal. UHF transmitter 56 transmits the first response signal from the antenna to on-vehicle device 10. Part (d) of FIG. 19 illustrates the UHF signal transmitted from UHF transmitter 56 of mobile device 12. The first measurement signal is received by mobile device 12, and then the first response signal is transmitted. The description returns to FIG. 17.

UHF receiver 34 of on-vehicle device 10 receives the first response signal via UHF antenna 78 from mobile device 12. UHF receiver 34 demodulates the received first response signal to generate a first response signal (that will be also referred to as the "first response signal" hereinafter) of a baseband signal. UHF receiver 34 outputs the first response signal to on-vehicle device controller 30. Part (e) of FIG. 19 illustrates a processing of the UHF signal received by UHF receiver 34 of on-vehicle device 10. As illustrated in part (d) of FIG. 5, the first response signal is received. The description returns to FIG. 17.

On-vehicle device controller 30 receives the first response signal from UHF receiver 34. On-vehicle device controller 30 extracts the transmission strength information included in the first response signal. As described above, the transmission strength information indicates the transmission strength for transmitting the second measurement signal from first antenna 72 and the transmission strength for transmitting the second measurement signal from second antenna 76. On-vehicle device controller 30 sets, to first LF transmitter 70, the transmission strength for transmitting the second measurement signal from first antenna 72, and sets, to second LF transmitter 74, the transmission strength for transmitting the second measurement signal from second antenna 76.

First LF transmitter 70 transmits the second measurement signal from first antenna 72 to mobile device 12 based on the transmission strength set by on-vehicle device controller 30. Further, second LF transmitter 74 transmits the second measurement signal from second antenna 76 to mobile device 12 based on the transmission strength set by on-vehicle device controller 30. That is, the second measurement signal is transmitted at different timing from first antenna 72 and second antenna 76 to mobile device 12.

In part (a) of FIG. 19, the first response signal is transmitted and then the second measurement signal is transmitted from first antenna 72. In part (b) of FIG. 19, the second measurement signal is transmitted from first antenna 72, and then the second measurement signal is transmitted from second antenna 76. Further, part (a) of FIG. 20 illustrates the second measurement signal set to 50% of the transmission strength of the first measurement signal. Part (b) of FIG. 20 illustrates the second measurement signal set to 120% of the transmission strength of the second measurement signal. The description returns to FIG. 17.

Figure 22C:
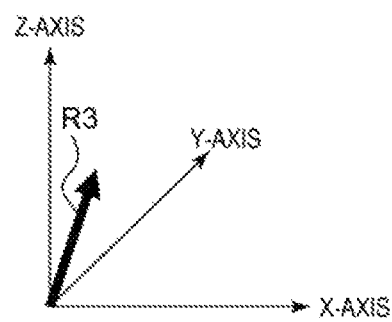
FIG. 22C is a view illustrating a measurement result of the measurement unit in FIG. 17.
Figure 22D:
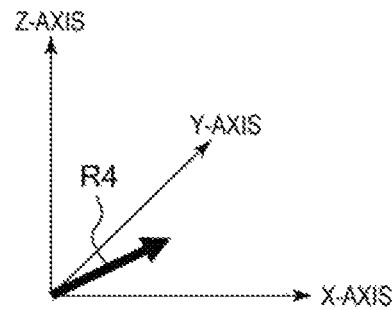
FIG. 22D is a view illustrating a measurement result of the measurement unit in FIG. 17.

LF receiver 50 of mobile device 12 receives the second measurement signals from first antenna 72 and second antenna 76 of on-vehicle device 10 at different timing. LF receiver 50 outputs the received second measurement signal from first antenna 72 and the received second measurement signal from second antenna 76 to measurement unit 52 in order. Measurement unit 52 measures reception strength of the second measurement signal from first antenna 72 similar to the above, and measures reception strength of the second measurement signal from second antenna 76 similar to the above. FIG. 22C illustrates reception strength "R3" of the second measurement signal from first antenna 72. FIG. 22D illustrates reception strength "R4" of the second measurement signal from second antenna 76. FIGS. 22C and 22D are illustrated similarly to FIG. 22A. The description returns to FIG. 17. Measurement unit 52 outputs the measured reception strength of the second measurement signal from first antenna 72 and the measured reception strength of the second measurement signal from second antenna 76 to mobile device controller 54.

In part (c) of FIG. 19, the second measurement signal from first antenna 72 is measured, and the second measurement signal from second antenna 76 is measured. In part (c) of FIG. 20, the first measurement signal from first antenna 72 and the first measurement signal from second antenna 76 are received. The description returns to FIG. 17.

Second determining unit 66 receives values of the transmission strength information generated by mobile device signal generator 64, i.e., a value of the transmission strength for transmitting the second measurement signal from first antenna 72 and a value of the transmission strength for transmitting the second measurement signal from second antenna 76. In the above example, the values are "50%, 120%". Second determining unit 66 multiplies the reception strength of the first measurement signal from first antenna 72 by the value such as "50%" of the transmission strength for transmitting the second measurement signal from first antenna 72. A multiplication result is a predicted value of the reception strength of the second measurement signal from first antenna 72.

Further, second determining unit 66 multiplies the reception strength of the first measurement signal from second antenna 76 by the value such as "120%" of the transmission strength for transmitting the second measurement signal from second antenna 76. A multiplication result is a predicted value of the reception strength of the second measurement signal from second antenna 76. Further, second determining unit 66 divides the latter multiplication result by the former multiplication result to derive a relationship (referred to as a "first relationship" below) between the predicted value of the reception strength of the second measurement signal from first antenna 72 and the predicted value of the reception strength of the second measurement signal from second antenna 76.

Furthermore, second determining unit 66 divides the reception strength of the second measurement signal from second antenna 76 by the reception strength of the second measurement signal from first antenna 72 to derive a relationship (referred to as a "second relationship" below) between the reception strength of the second measurement signal from first antenna 72 and the reception strength of the second measurement signal from second antenna 76. When a difference between the first relationship and the second relationship is a threshold or more, second determining unit 66 does not execute a process described below. On the other hand, when the difference is smaller than the threshold, second determining unit 66 executes the process described below.

Estimating unit 68 receives, from measurement unit 52, each axis direction component of the first measurement signal from first antenna 72. Each axis direction component is as illustrated in FIG. 22A. Estimating unit 68 derives angle θ1 formed between vector R1 and the Z-axis based on each axis direction component. Further, estimating unit 68 derives a mapping of vector R1 with respect to an X-Y plane, and also derives angle φ1 formed between the mapping and the X-axis. A publicly known vector arithmetic operation only needs to be used to derive angle θ1 and angle φ1, and therefore, description thereof will be omitted herein. Further, estimating unit 68 receives, from measurement unit 52, each axis direction component of the first measurement signal from second antenna 76. By executing the same process as the above process, estimating unit 68 derives angle θ2 and angle φ2 with respect to vector R2 that is not illustrated. Deriving angle θ1, angle φ1, angle θ2 and angle φ2 corresponds to estimating a transmission direction of the first measurement signal. Estimating unit 68 outputs angle θ1, angle φ1, angle θ2 and angle φ2 to second determining unit 66.

Further, estimating unit 68 receives each axis direction component of the second measurement signal from first antenna 72, and derives angle θ3 and angle φ3 with respect to vector R3 that is not illustrated by executing the same process. Furthermore, estimating unit 68 receives each axis direction component of the second measurement signal from second antenna 76, and derives angle θ4 and angle φ4 with respect to vector R4 that is not illustrated by executing the same process. Deriving angle θ3, angle φ3, angle θ4 and angle 44 corresponds to estimating a transmission direction of the second measurement signal. Thus, estimating unit 68 estimates the transmission direction of the first measurement signal and the transmission direction of the second measurement signal based on reception strength of each dimension of the multi-dimensional antenna. Estimating unit 68 outputs angle θ3, angle φ3, angle θ4 and angle φ4 to second determining unit 66.

Second determining unit 66 derives a difference between angle θ1 and angle θ3, a difference between angle φ1 and angle 3, a difference between angle θ2 and angle θ4, and a difference between angle φ2 and angle φ. Second determining unit 66 holds thresholds for these angles. When at least one of all differences is the threshold or more, the process described below is not executed. On the other hand, when all differences are smaller than the thresholds, the process described below is executed. It can be said that such a situation is a case where a difference between the estimate transmission direction of the first measurement signal and the estimated transmission direction of the second measurement signal is smaller than the threshold. In this case, mobile device signal generator 64 generates a second response signal. Mobile device signal generator 64 outputs the second response signal to UHF transmitter 56.

UHF transmitter 56 receives the second response signal from mobile device signal generator 64. UHF transmitter 56 executes a modulation process on the second response signal to generate a second response signal (that will be also referred to as the "second response signal" hereinafter) of the UHF signal. UHF transmitter 56 transmits the second response signal from the antenna to on-vehicle device 10. In part (d) of FIG. 19, mobile device 12 receives the second measurement signal, and then transmits the second response signal. The description returns to FIG. 17.

UHF receiver 34 of on-vehicle device 10 receives the second response signal from mobile device 12. UHF receiver 34 demodulates the received second response signal to generate a second response signal (that will be also referred to as the "second response signal" hereinafter) of the baseband signal. UHF receiver 34 outputs the second response signal to on-vehicle device controller 30. As illustrated in part (e) of FIG. 19, the second response signal is received. The description returns to FIG. 17.

On-vehicle device controller 30 receives the second response signal from UHF receiver 34. When receiving the second response signal, on-vehicle device controller 30 instructs ECU 16 of vehicle 110 to unlock door lock mechanism 18.

This configuration can be achieved with a CPU, a memory, and other LSI in terms of hardware or with a program or an application loaded on the memory in terms of software. The drawing herein illustrates functional blocks achieved through coordination of these components. Hence, it will be understood by those skilled in the art that these functional blocks can be achieved in various forms by the hardware alone or by combinations of the hardware and the software.

Figure 23:
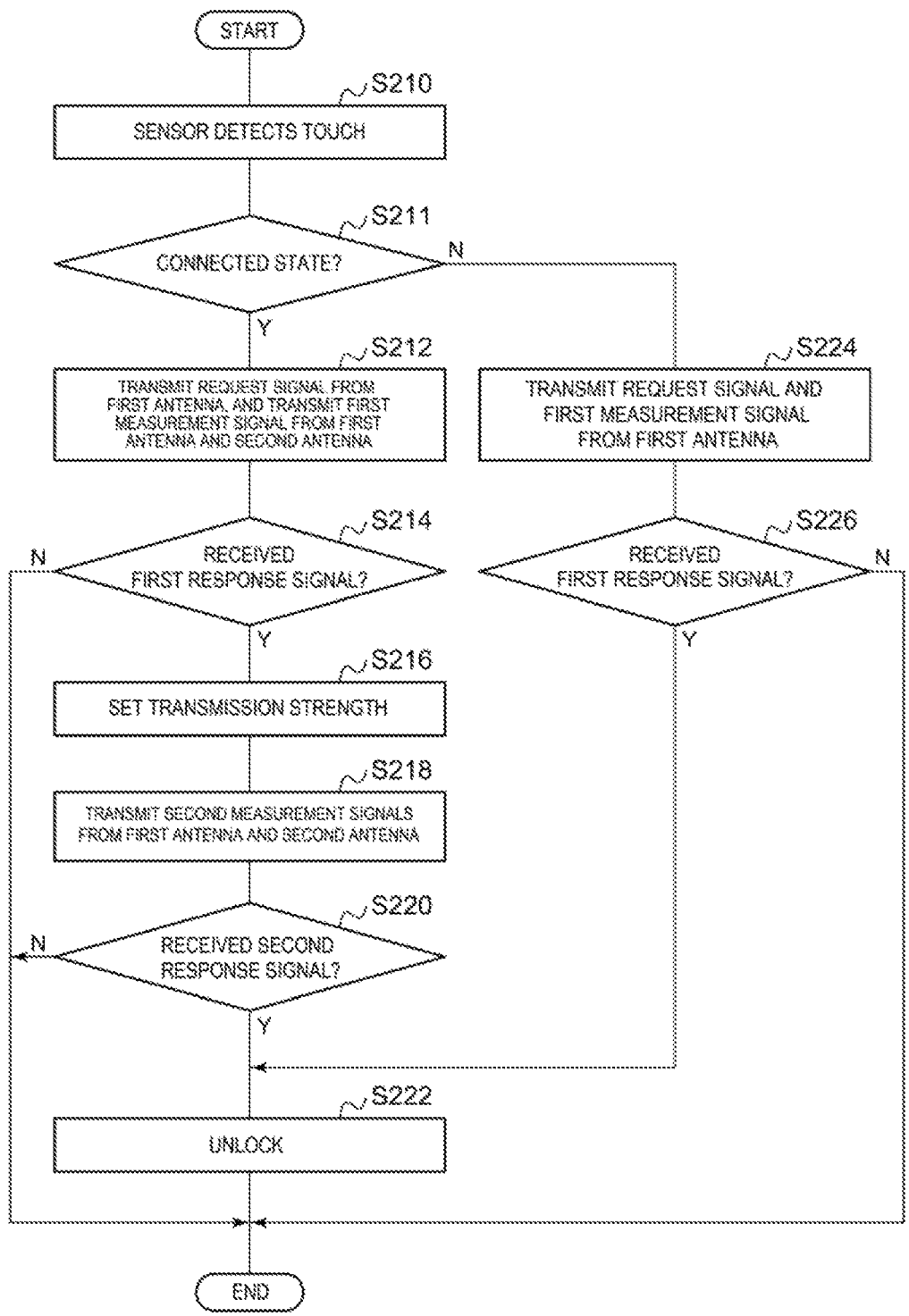
FIG. 23 is a flowchart illustrating a communication procedure of the on-vehicle device in FIG. 17.

An operation of vehicle wireless communication system 100 employing the above configuration will be described. FIG. 23 is a flowchart illustrating a communication procedure of on-vehicle device 10. Sensor 14 detects a touch (S210). When communication unit 40 is not in a connected state (N in S211), first antenna 72 transmits a request signal, and first antenna 72 and second antenna 76 transmits first measurement signal (S212). When UHF receiver 34 receives a first response signal (Y in S214), on-vehicle device controller 30 sets transmission strength to first LF transmitter 70 and second LF transmitter 74 (S216), and first antenna 72 and second antenna 76 transmit second measurement signals (S218). When UHF receiver 34 receives a second response signal (Y in S220), ECU 16 causes door lock mechanism 18 to unlock (S222). When UHF receiver 34 does not receive the first response signal (N in S214) or when UHF receiver 34 does not receive the second response signal (N in S220), a process is finished.

When communication unit 40 is in the connected state (Y in S211), first antenna 72 transmits the request signal and the first measurement signal (S224). When UHF receiver 34 receives the first response signal (Y in S226), ECU 16 causes door lock mechanism 18 to unlock (S222). When UHF receiver 34 does not receive the first response signal (N in S226), the process is finished.

Figure 24:
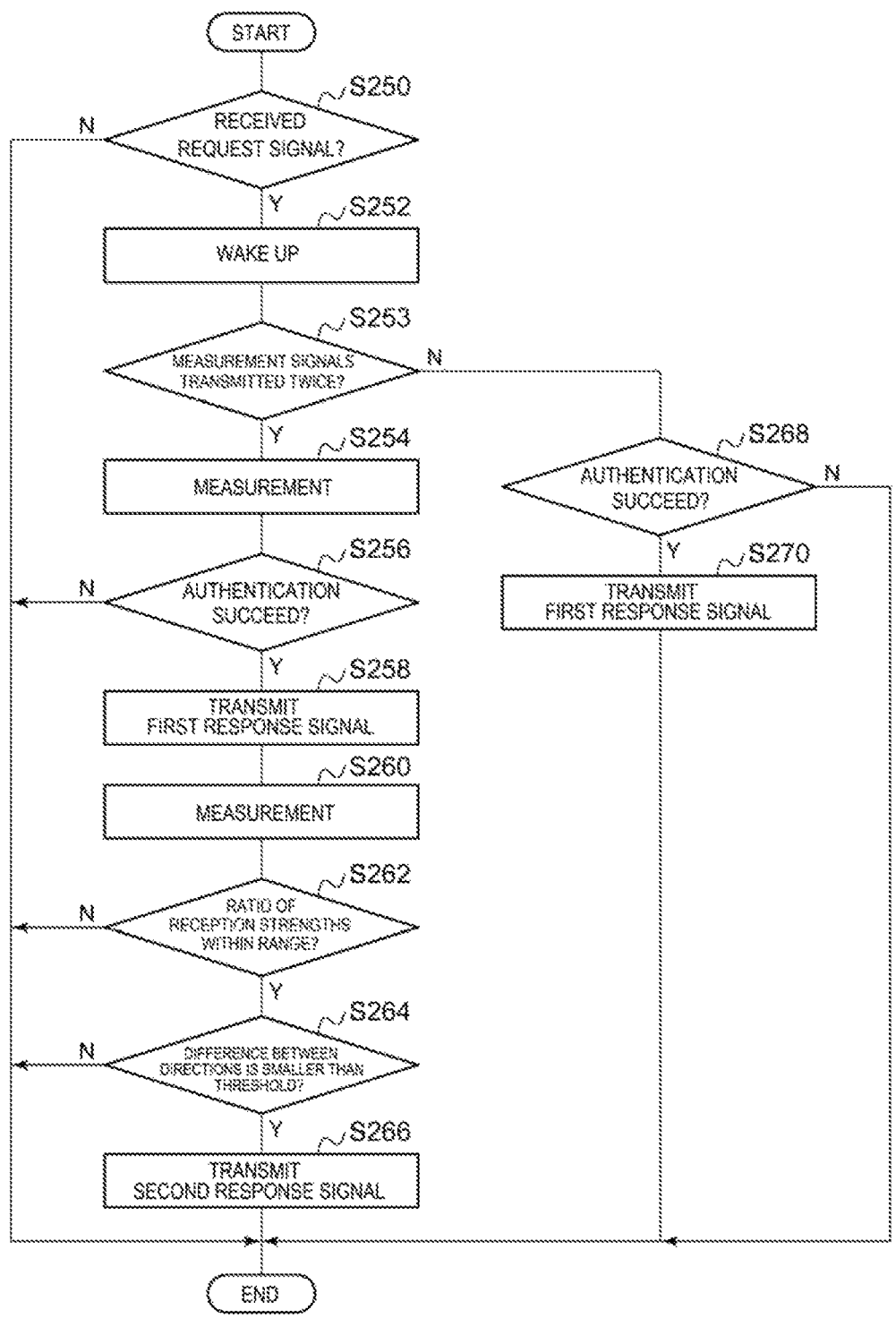
FIG. 24 is a flowchart illustrating a communication procedure of a mobile device in FIG. 17.

FIG. 24 is a flowchart illustrating a communication procedure of mobile device 12. When LF receiver 50 receives the request signal (Y in S250), mobile device controller 54 wakes up (S252). When connection information indicates that measurement signals are transmitted twice (Y in S253), measurement unit 52 measures reception strength of the first measurement signal from first antenna 72 and reception strength of the first measurement signal from second antenna 76 (S254). When authentication succeeds in first determining unit 62 (Y in S256), UHF transmitter 56 transmits the first response signal including the transmission strength (S258). Further, measurement unit 52 measures reception strength of the second measurement signal from first antenna 72 and reception strength of the second measurement signal from second antenna 76 (S260). When a signal strength ratio is within a range (Y in S262) and the difference between directions in which signals come is smaller than the threshold (Y in S264), UHF transmitter 56 transmits the second response signal (S266). In one of a case where LF receiver 50 does not receive the request signal (N in S250), a case where authentication does not succeed (N in S256), a case where the signal strength ratio is not within the range (N in S262), and a case where the difference between the directions in which the signals come is not smaller than the threshold (N in S264), the process is finished.

When the connection information does not indicate that the measurement signals are transmitted twice (N in S253) and when authentication succeeds in first determining unit 62 (Y in S268), UHF transmitter 56 transmits the first response signal (S270). When authentication does not succeed (N in S268), the process is finished.

According to the third exemplary embodiment of the present disclosure, when the relationship between the reception strength of the second measurement signal of the first antenna and the reception strength of the second measurement signal of the second antenna matches the transmission strength information included in the first response signal, the second response signal is received. Consequently, it is possible to make determination based on information in addition to the reception strength. Further, the determination is made based on the information in addition to the reception strength, so that it is possible to make reproduction difficult. Furthermore, reproduction becomes difficult, so that it is possible to reduce the risk of the relay attack. Still further, the ratio of the transmission strength from the first antenna and the transmission strength from the second antenna is changed between the first measurement signal and the second measurement signal, so that it is possible to make reproduction difficult.

Moreover, when the relationship between the reception strength of the second measurement signal of the first antenna and the reception strength of the second measurement signal of the second antenna matches the transmission strength information included in the first response signal, the second response signal is transmitted. Consequently, it is possible to reduce the risk of the relay attack. Further, when the difference between the transmission direction of the first measurement signal and the transmission direction of the second measurement signal is smaller than the threshold, the second response signal is transmitted. Consequently, it is possible to further improve safety. Further, relaying signals from a plurality of antennas requires a lot of work, so that it is possible to reduce the risk of the relay attack.

An outline of one aspect of the present disclosure is as follows. An on-vehicle device according to one aspect of the present disclosure includes: a communication unit that can execute communication using a first communication scheme; a transmitter that transmits a request signal and a measurement signal to a mobile device, using a second communication scheme different from the first communication scheme of the communication unit; and a receiver that receives a response signal from the mobile device that has received the request signal and the measurement signal transmitted from the transmitter. The transmitter changes a number of times of transmission of the measurement signal transmitted subsequently to the request signal based on whether or not the communication of the communication unit is in a connected state.

According to this aspect, the number of times of transmission of the measurement signal transmitted subsequently to the request signal is changed based on whether or not the communication is in the connected state. Consequently, it is possible to reduce a risk of a relay attack irrespectively of whether or not a user possesses a wireless terminal device.

A number of times of transmission of the measurement signal transmitted from the transmitter in a case where the communication of the communication unit is in the connected state may be less than a number of times of transmission of the measurement signal transmitted from the transmitter in a case where the communication of the communication unit is in a non-connected state. In this case, when the communication is in the connected state, the number of times of transmission of the measurement signal is decreased. Consequently, it is possible to reduce a process delay while reducing the risk of the relay attack.

The transmitter may set the number of times of transmission of the measurement signal to at least two when the communication of the communication unit is in a non-connected state, and set the number of times of transmission of the measurement signal to 1 when the communication of the communication unit is in the connected state. In this case, when the communication is in the connected state, the number of times of transmission of the measurement signal is set to "1", so that it is possible to make a process simple.

Another aspect of the present disclosure is a mobile device. This mobile device includes: a receiver that receives a request signal and a measurement signal from an on-vehicle device, using a second communication scheme different from a first communication scheme; and a transmitter that transmits a response signal to the on-vehicle device when the receiver receives the request signal and the measurement signal. The receiver changes a number of times of reception of the measurement signal received subsequently to the request signal based on whether or not communication of the on-vehicle device using the first communication scheme is in a connected state.

According to this aspect, the number of times of transmission of the measurement signal transmitted subsequently to the request signal is changed based on whether or not the communication is in the connected state. Consequently, it is possible to reduce the risk of the relay attack irrespectively of whether or not the user possesses the wireless terminal device.

Still another aspect of the present disclosure is a vehicle wireless communication system. This vehicle wireless communication system includes: an on-vehicle device that is capable of executing communication using a first communication scheme and transmits a request signal and a measurement signal using a second communication scheme different from the first communication scheme; and a mobile device that transmits a response signal to the on-vehicle device when receiving the request signal and the measurement signal. The on-vehicle device changes a number of times of transmission of the measurement signal transmitted subsequently to the request signal based on whether or not the communication of the first communication scheme is in a connected state.

According to this aspect, the number of times of transmission of the measurement signal transmitted subsequently to the request signal is changed based on whether or not the communication is in the connected state. Consequently, it is possible to reduce the risk of the relay attack irrespectively of whether or not the user possesses the wireless terminal device.

The present disclosure has been described above according to the exemplary embodiments. It will be understood by those skilled in the art that the exemplary embodiments are merely examples, other modifications in which components and/or processes of the exemplary embodiments are variously combined are possible, and the other modifications still fall within the scope of the present disclosure.

In the first to third exemplary embodiments, UHF transmitter 56 and UHF receiver 34 use UHF signals. However, UHF transmitter 56 and UHF receiver 34 are not limited to this, and may use signals having a higher frequency than the LF. This modification can improve a degree of freedom in configuration.

According to the first exemplary embodiment, the transmission strength information generated by mobile device signal generator 64 is set based on the reception strength of the first measurement signal measured by measurement unit 52. However, the transmission strength information is not limited to this, and may be set irrespectively of the reception strength of the first measurement signal measured by measurement unit 52. This modification can improve the degree of freedom in the configuration.

In the first exemplary embodiment, four stages of reception strength ranges are set to mobile device signal generator 64. However, mobile device signal generator 64 is not limited to this, and stages other than four stages of the reception strength ranges may be set to mobile device signal generator 64. This modification can improve the degree of freedom in the configuration.

In the third exemplary embodiment, estimating unit 68 estimates a transmission direction of the first measurement signal and a transmission direction of the second measurement signal, and second determining unit 66 includes that the estimated transmission directions are close, as conditions for determining whether or not to transmit the second response signal. However, the third exemplary embodiment is not limited to this, and may not include estimating unit 68 and second determining unit 66 may not include the estimated transmission directions as the conditions. In this case, second determining unit 66 determines whether or not to transmit the second response signal based on a difference between a first relationship and a second relationship. According to this modification, it is possible to easily perform a process.

First to third exemplary embodiments have described vehicle wireless communication system 100 as a relay attack countermeasure for door unlocking. However, vehicle wireless communication system 100 is not limited to this, and vehicle wireless communication system 100 that is the relay attack countermeasure may be applied to an engine start operation of a vehicle of a keyless entry system, for example. According to this modification, it is possible to reduce the risk of the relay attack during engine start of the vehicle.

An on-vehicle device, a mobile device, and a vehicle wireless communication system that include the on-vehicle device and the mobile device according to the present disclosure are effective for a keyless entry system used to unlock doors or start engines.

What is claimed is:

1. A vehicle wireless communication system for a vehicle comprising:
    an on-vehicle device configured to be coupled with a first antenna and a second antenna, being capable of communicating with a device through the first antenna, being distinct from the device, and configured to transmit a request signal and a measurement signal through the second antenna; and
    a mobile device comprising a third antenna, configured to receive the request signal and the measurement signal through the third antenna, and configured to transmit a response signal to the on-vehicle device,
    wherein
    when the on-vehicle device connects with the device through the first antenna, the on-vehicle device transmits the measurement signal one or more times through the second antenna to the mobile device,
    when the on-vehicle device does not connect with the device through the first antenna, the on-vehicle device transmits the measurement signal two or more times through the second antenna to the mobile device, and
    a first number of the one or more times of transmission of the measurement signal is smaller than a second number of the two or more times of transmission of the measurement signal.

2. The vehicle wireless communication system according to claim 1, wherein the on-vehicle device outputs a command to unlock door lock mechanism of the vehicle, based on at least the response signal of the mobile device.

3. The vehicle wireless communication system according to claim 1, wherein the on-vehicle device transmits the measurement signal through the second antenna using a first frequency, and the mobile device transmits the response signal through a fourth antenna using a second frequency, the first frequency being lower than the second frequency.

* * * * *